(12) United States Patent
Myllynen et al.

(10) Patent No.: US 8,477,786 B2
(45) Date of Patent: *Jul. 2, 2013

(54) MESSAGING SYSTEM AND SERVICE

(75) Inventors: Harri Myllynen, Helsinki (FI); Pasi Leino, London (GB); Antti Ohrling, London (GB)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/483,043

(22) Filed: May 29, 2012

(65) Prior Publication Data

US 2012/0238299 A1 Sep. 20, 2012

Related U.S. Application Data

(60) Continuation of application No. 12/477,766, filed on Jun. 3, 2009, now abandoned, which is a continuation of application No. 12/002,452, filed on Dec. 17, 2007, now Pat. No. 7,653,064, which is a division of application No. 10/555,543, filed as application No. PCT/GB2004/001953 on May 6, 2004, now Pat. No. 8,243,636.

(30) Foreign Application Priority Data

| May 6, 2003 | (GB) | .................................... | 0310366.0 |
| May 20, 2003 | (GB) | .................................... | 0311592.0 |
| Jul. 8, 2003 | (GB) | .................................... | 0315984.5 |

(51) Int. Cl.
*H04L 12/28* (2006.01)
*H04L 12/56* (2006.01)
*H04L 12/54* (2006.01)
*G06F 15/16* (2006.01)

(52) U.S. Cl.
USPC ............................ 370/392; 370/428; 709/231

(58) Field of Classification Search
USPC ........................................... 370/389, 392, 428
See application file for complete search history.

(56) References Cited

U.S. PATENT DOCUMENTS

| 5,355,302 A | 10/1994 | Martin |
| 5,375,235 A | 12/1994 | Berry et al. |

(Continued)

FOREIGN PATENT DOCUMENTS

| BE | 1015704 | 7/2005 |
| DE | 19941461 | 3/2001 |

(Continued)

OTHER PUBLICATIONS

Industry Standard, The, Help FAQs for Standard Prediction Market, http://www.thestandard.com/help, downloaded Jun. 29, 2009.

(Continued)

*Primary Examiner* — Ronald Abelson
(74) *Attorney, Agent, or Firm* — Novak Druce Connolly Bove + Quigg LLP

(57) ABSTRACT

A method of modifying a data message during transmission through a data communications network, the data communications network being arranged to deliver messages under control of a network operator and including a first store-and-forward network node. The first store-and-forward network node is arranged to store data messages and forward the same to a recipient in dependence on status data corresponding to a terminal associated therewith. The method further includes receiving a message at a second store-and-forward node, wherein the second store-and-forward node is different from the first store-and-forward network node, arranging for the message to be modified before being forwarded from the second store-and forward node, and transmitting the message to the first store-and-forward network node for forwarding to the recipient.

30 Claims, 15 Drawing Sheets

U.S. PATENT DOCUMENTS

| | | | |
|---|---|---|---|
| 5,408,519 A | 4/1995 | Pierce et al. |
| 5,464,946 A | 11/1995 | Lewis |
| 5,483,278 A | 1/1996 | Strubbe |
| 5,583,763 A | 12/1996 | Atcheson et al. |
| 5,613,213 A | 3/1997 | Naddell et al. |
| 5,640,590 A | 6/1997 | Luther |
| 5,697,844 A | 12/1997 | Von Kohorn |
| 5,724,521 A | 3/1998 | Dedrick |
| 5,754,939 A | 5/1998 | Herz |
| 5,758,257 A | 5/1998 | Herz |
| 5,765,144 A | 6/1998 | Larche |
| 5,890,152 A | 3/1999 | Rapaport |
| 5,892,451 A | 4/1999 | May |
| 5,918,014 A | 6/1999 | Robinson |
| 5,950,176 A | 9/1999 | Keiser |
| 5,978,775 A | 11/1999 | Chen |
| 5,978,833 A | 11/1999 | Pashley et al. |
| 6,000,044 A | 12/1999 | Chrysos et al. |
| 6,009,458 A | 12/1999 | Hawkins |
| 6,023,700 A | 2/2000 | Owens et al. |
| 6,038,591 A | 3/2000 | Wolfe |
| 6,043,818 A | 3/2000 | Nakano |
| 6,047,311 A | 4/2000 | Ueno et al. |
| 6,097,942 A | 8/2000 | Laiho |
| 6,112,186 A | 8/2000 | Bergh et al. |
| 6,134,532 A | 10/2000 | Lazarus et al. |
| 6,205,432 B1 | 3/2001 | Gabbard |
| 6,222,925 B1 | 4/2001 | Shiels |
| 6,269,361 B1 | 7/2001 | Davis et al. |
| 6,334,145 B1 | 12/2001 | Adams et al. |
| 6,338,044 B1 | 1/2002 | Cook et al. |
| 6,345,279 B1 | 2/2002 | Li et al. |
| 6,345,288 B1 | 2/2002 | Reed |
| 6,346,951 B1 | 2/2002 | Mastronardi |
| 6,347,313 B1 | 2/2002 | Ma |
| 6,349,339 B1 | 2/2002 | Williams |
| 6,381,465 B1 | 4/2002 | Chern et al. |
| 6,381,575 B1 | 4/2002 | Martin |
| 6,389,278 B1 | 5/2002 | Singh |
| 6,405,243 B1 | 6/2002 | Nielsen |
| 6,408,309 B1 | 6/2002 | Agarwal |
| 6,430,539 B1 | 8/2002 | Lazarus et al. |
| 6,434,621 B1 | 8/2002 | Pezzillo |
| 6,438,557 B1 | 8/2002 | Dent |
| 6,438,579 B1 | 8/2002 | Hosken |
| 6,487,539 B1 | 11/2002 | Aggarwal et al. |
| 6,516,416 B2 | 2/2003 | Gregg |
| 6,526,411 B1 | 2/2003 | Ward |
| 6,532,469 B1 | 3/2003 | Feldman et al. |
| 6,577,716 B1 | 6/2003 | Minter |
| 6,587,127 B1 | 7/2003 | Leeke et al. |
| 6,596,405 B2 | 7/2003 | Zampini et al. |
| 6,615,208 B1 | 9/2003 | Behrens et al. |
| 6,628,247 B2 | 9/2003 | Toffolo |
| 6,633,318 B1 | 10/2003 | Kim |
| 6,646,657 B1 | 11/2003 | Rouser |
| 6,647,371 B2 | 11/2003 | Shinohara |
| 6,684,249 B1 | 1/2004 | Frerichs et al. |
| 6,687,696 B2 | 2/2004 | Hofmann et al. |
| 6,690,918 B2 | 2/2004 | Evans et al. |
| 6,704,576 B1 | 3/2004 | Brachman et al. |
| 6,718,551 B1 | 4/2004 | Swix et al. |
| 6,748,395 B1 | 6/2004 | Picker et al. |
| 6,751,574 B2 | 6/2004 | Shinohara |
| 6,785,688 B2 | 8/2004 | Abajian et al. |
| 6,816,724 B1 | 11/2004 | Asikainen |
| 6,826,572 B2 | 11/2004 | Colace |
| 6,842,761 B2 | 1/2005 | Diamond et al. |
| 6,850,252 B1 | 2/2005 | Hoffberg |
| 6,914,891 B2 | 7/2005 | Ha et al. |
| 6,920,326 B2 | 7/2005 | Agarwal et al. |
| 6,931,454 B2 | 8/2005 | Deshpande et al. |
| 6,933,433 B1 | 8/2005 | Porteus |
| 6,941,324 B2 | 9/2005 | Plastina |
| 6,947,922 B1 | 9/2005 | Glance |
| 6,950,804 B2 | 9/2005 | Strietzel |
| 6,987,221 B2 | 1/2006 | Platt |
| 6,990,497 B2 | 1/2006 | O'Rourke et al. |
| 6,993,532 B1 | 1/2006 | Platt et al. |
| 7,013,238 B1 | 3/2006 | Weare |
| 7,020,637 B2 | 3/2006 | Bratton |
| 7,021,836 B2 | 4/2006 | Anderson |
| 7,035,812 B2 | 4/2006 | Meisel |
| 7,051,352 B1 | 5/2006 | Schaffer |
| 7,058,696 B1 | 6/2006 | Phillips et al. |
| 7,072,846 B1 | 7/2006 | Robinson |
| 7,072,947 B1 | 7/2006 | Knox et al. |
| 7,082,407 B1 | 7/2006 | Bezos et al. |
| 7,096,234 B2 | 8/2006 | Plastina |
| 7,111,240 B2 | 9/2006 | Crow |
| 7,113,917 B2 | 9/2006 | Jacobi |
| 7,113,999 B2 | 9/2006 | Pestoni et al. |
| 7,120,619 B2 | 10/2006 | Drucker |
| 7,127,143 B2 | 10/2006 | Elkins, II et al. |
| 7,136,866 B2 | 11/2006 | Springer, Jr. |
| 7,136,903 B1 | 11/2006 | Phillips et al. |
| 7,139,723 B2 | 11/2006 | Conkwright |
| 7,149,537 B1 | 12/2006 | Kupsh et al. |
| 7,174,126 B2 | 2/2007 | McElhatten |
| 7,174,309 B2 | 2/2007 | Niwa |
| 7,180,473 B2 | 2/2007 | Horie |
| 7,181,415 B2 | 2/2007 | Blaser et al. |
| 7,188,085 B2 | 3/2007 | Pelletier |
| 7,194,421 B2 | 3/2007 | Conkwright |
| 7,197,472 B2 | 3/2007 | Conkwright |
| 7,222,105 B1 | 5/2007 | Romansky |
| 7,224,282 B2 | 5/2007 | Terauchi et al. |
| 7,225,342 B2 | 5/2007 | Takao |
| 7,236,941 B2 | 6/2007 | Conkwright |
| 7,246,041 B2 | 7/2007 | Fukuda |
| 7,256,341 B2 | 8/2007 | Plastina |
| 7,277,870 B2 | 10/2007 | Mourad et al. |
| 7,296,158 B2 | 11/2007 | Staddon |
| 7,302,419 B2 | 11/2007 | Conkwright |
| 7,302,468 B2 | 11/2007 | Wijeratne |
| 7,328,343 B2 | 2/2008 | Caronni |
| 7,358,434 B2 | 4/2008 | Plastina |
| 7,360,084 B1 | 4/2008 | Hardjono |
| 7,363,314 B2 | 4/2008 | Picker et al. |
| 7,383,329 B2 | 6/2008 | Erickson |
| 7,383,586 B2 | 6/2008 | Cross |
| 7,392,212 B2 | 6/2008 | Hancock |
| 7,403,769 B2 | 7/2008 | Kopra |
| 7,415,181 B2 | 8/2008 | Greenwood |
| 7,434,247 B2 | 10/2008 | Dudkiewicz et al. |
| 7,455,590 B2 | 11/2008 | Hansen |
| 7,457,862 B2 | 11/2008 | Hepworth et al. |
| 7,457,946 B2 | 11/2008 | Hind |
| 7,478,323 B2 | 1/2009 | Dowdy |
| 7,490,775 B2 | 2/2009 | Biderman |
| 7,492,371 B2 | 2/2009 | Jeffrey |
| 7,493,572 B2 | 2/2009 | Card et al. |
| 7,499,630 B2 | 3/2009 | Koch et al. |
| 7,505,959 B2 | 3/2009 | Kaiser et al. |
| 7,546,254 B2 | 6/2009 | Bednarek |
| 7,558,559 B2 | 7/2009 | Alston |
| 7,568,213 B2 | 7/2009 | Carhart et al. |
| 7,571,121 B2 | 8/2009 | Bezos |
| 7,571,183 B2 | 8/2009 | Renshaw et al. |
| 7,574,422 B2 | 8/2009 | Guan et al. |
| 7,574,513 B2 | 8/2009 | Dunning et al. |
| 7,580,932 B2 | 8/2009 | Plastina et al. |
| 7,581,101 B2 | 8/2009 | Ahtisaari |
| 7,599,847 B2 | 10/2009 | Block |
| 7,599,906 B2 | 10/2009 | Kashiwagi |
| 7,599,950 B2 | 10/2009 | Walther et al. |
| 7,644,077 B2 | 1/2010 | Picker et al. |
| 7,647,613 B2 | 1/2010 | Drakoulis |
| 7,657,224 B2 | 2/2010 | Goldberg et al. |
| 7,657,493 B2 | 2/2010 | Meijer |
| 7,680,849 B2 | 3/2010 | Heller |
| 7,680,959 B2 | 3/2010 | Svendsen |
| 7,685,204 B2 | 3/2010 | Rogers |
| 7,690,026 B2 | 3/2010 | Zhu |
| 7,693,887 B2 | 4/2010 | McLaughlin |
| 7,707,603 B2 | 4/2010 | Abanami |
| 7,720,871 B2 | 5/2010 | Rogers et al. |

| | | |
|---|---|---|
| 7,725,494 B2 | 5/2010 | Rogers et al. |
| 7,734,569 B2 | 6/2010 | Martin |
| 7,739,723 B2 | 6/2010 | Rogers |
| 7,747,620 B2 | 6/2010 | Beaupre |
| 7,801,896 B2 | 9/2010 | Szabo |
| 7,818,350 B2 | 10/2010 | New |
| 7,826,444 B2 | 11/2010 | Irvin |
| 7,831,199 B2 | 11/2010 | Ng |
| 7,840,570 B2 | 11/2010 | Cervera et al. |
| 7,844,498 B2 | 11/2010 | Robbin |
| 7,853,712 B2 | 12/2010 | Amidon et al. |
| 7,875,788 B2 | 1/2011 | Benyamin |
| 7,882,543 B2 | 2/2011 | Mousseau |
| 7,889,724 B2 | 2/2011 | Irvin |
| 2001/0007099 A1 | 7/2001 | Rau |
| 2001/0021914 A1 | 9/2001 | Jacobi et al. |
| 2001/0042017 A1 | 11/2001 | Matsukawa |
| 2001/0047272 A1 | 11/2001 | Frietas et al. |
| 2001/0051925 A1 | 12/2001 | Kang |
| 2001/0056434 A1 | 12/2001 | Kaplan et al. |
| 2002/0002510 A1 | 1/2002 | Sharp |
| 2002/0002899 A1 | 1/2002 | Gjerdingen |
| 2002/0004413 A1 | 1/2002 | Inoue |
| 2002/0004743 A1 | 1/2002 | Kutaragi |
| 2002/0006803 A1 | 1/2002 | Mendiola et al. |
| 2002/0016736 A1* | 2/2002 | Cannon et al. ............... 705/14 |
| 2002/0019829 A1 | 2/2002 | Shapiro |
| 2002/0042912 A1 | 4/2002 | Iijima et al. |
| 2002/0052754 A1 | 5/2002 | Joyce |
| 2002/0059094 A1 | 5/2002 | Hosea et al. |
| 2002/0059379 A1 | 5/2002 | Harvey |
| 2002/0061743 A1 | 5/2002 | Hutcheson |
| 2002/0073210 A1 | 6/2002 | Low et al. |
| 2002/0075305 A1 | 6/2002 | Beaton et al. |
| 2002/0077130 A1 | 6/2002 | Owensby |
| 2002/0078006 A1 | 6/2002 | Shteyn |
| 2002/0082901 A1 | 6/2002 | Dunning et al. |
| 2002/0082923 A1 | 6/2002 | Merriman et al. |
| 2002/0083411 A1 | 6/2002 | Bouthors et al. |
| 2002/0095330 A1 | 7/2002 | Berkowitz |
| 2002/0111177 A1 | 8/2002 | Castres |
| 2002/0128029 A1 | 9/2002 | Nishikawa |
| 2002/0137507 A1 | 9/2002 | Winkler |
| 2002/0138291 A1 | 9/2002 | Vaidyanathan et al. |
| 2002/0141403 A1 | 10/2002 | Akahane |
| 2002/0152117 A1 | 10/2002 | Cristofalo et al. |
| 2002/0164962 A1 | 11/2002 | Mankins |
| 2002/0174430 A1 | 11/2002 | Ellis |
| 2002/0178223 A1 | 11/2002 | Bushkin |
| 2002/0178276 A1 | 11/2002 | McCartney et al. |
| 2002/0183045 A1 | 12/2002 | Emmerson |
| 2002/0194215 A1 | 12/2002 | Cantrell et al. |
| 2003/0003929 A1 | 1/2003 | Himmel et al. |
| 2003/0003935 A1* | 1/2003 | Vesikivi et al. ............... 455/517 |
| 2003/0018797 A1 | 1/2003 | Dunning et al. |
| 2003/0033321 A1 | 2/2003 | Schrempp et al. |
| 2003/0037068 A1 | 2/2003 | Thomas |
| 2003/0040297 A1 | 2/2003 | Pecen et al. |
| 2003/0040300 A1 | 2/2003 | Bodic et al. |
| 2003/0055689 A1 | 3/2003 | Block |
| 2003/0064757 A1 | 4/2003 | Yamadera et al. |
| 2003/0083108 A1 | 5/2003 | King |
| 2003/0097379 A1 | 5/2003 | Ireton |
| 2003/0101126 A1 | 5/2003 | Cheung |
| 2003/0120630 A1 | 6/2003 | Tunkelang |
| 2003/0126015 A1 | 7/2003 | Chan et al. |
| 2003/0130887 A1 | 7/2003 | Nathaniel |
| 2003/0144022 A1 | 7/2003 | Hatch |
| 2003/0154300 A1 | 8/2003 | Mostafa |
| 2003/0163369 A1 | 8/2003 | Arr |
| 2003/0182567 A1 | 9/2003 | Barton et al. |
| 2003/0185356 A1 | 10/2003 | Katz |
| 2003/0188017 A1 | 10/2003 | Nomura |
| 2003/0191689 A1 | 10/2003 | Bosarge et al. |
| 2003/0195039 A1 | 10/2003 | Orr |
| 2003/0197719 A1 | 10/2003 | Lincke et al. |
| 2003/0203731 A1 | 10/2003 | King |
| 2003/0212710 A1 | 11/2003 | Guy |
| 2003/0220866 A1 | 11/2003 | Pisaris-Henderson |
| 2003/0229537 A1 | 12/2003 | Dunning et al. |
| 2004/0002993 A1 | 1/2004 | Toussaint et al. |
| 2004/0003392 A1 | 1/2004 | Trajkovic et al. |
| 2004/0003398 A1 | 1/2004 | Donian et al. |
| 2004/0032393 A1 | 2/2004 | Brandenberg |
| 2004/0032434 A1 | 2/2004 | Pinsky et al. |
| 2004/0043777 A1 | 3/2004 | Brouwer et al. |
| 2004/0043790 A1 | 3/2004 | Ben-David |
| 2004/0045029 A1 | 3/2004 | Matsuura |
| 2004/0045030 A1 | 3/2004 | Reynolds |
| 2004/0054576 A1 | 3/2004 | Kanerva et al. |
| 2004/0063449 A1 | 4/2004 | Fostick |
| 2004/0068460 A1 | 4/2004 | Feeley |
| 2004/0068552 A1 | 4/2004 | Kotz et al. |
| 2004/0073924 A1 | 4/2004 | Pendakur |
| 2004/0092248 A1 | 5/2004 | Kelkar |
| 2004/0093289 A1 | 5/2004 | Bodin |
| 2004/0128286 A1 | 7/2004 | Yasushi et al. |
| 2004/0136358 A1 | 7/2004 | Hind et al. |
| 2004/0137987 A1 | 7/2004 | Nguyen |
| 2004/0139064 A1 | 7/2004 | Chevallier et al. |
| 2004/0143667 A1 | 7/2004 | Jerome |
| 2004/0148424 A1 | 7/2004 | Berkson et al. |
| 2004/0152518 A1 | 8/2004 | Kogo |
| 2004/0158860 A1 | 8/2004 | Crow |
| 2004/0162738 A1 | 8/2004 | Sanders et al. |
| 2004/0185883 A1 | 9/2004 | Rukman |
| 2004/0186789 A1 | 9/2004 | Nakashima |
| 2004/0192359 A1 | 9/2004 | McRaild et al. |
| 2004/0194128 A1 | 9/2004 | McIntyre |
| 2004/0198403 A1 | 10/2004 | Pedersen |
| 2004/0203761 A1 | 10/2004 | Baba et al. |
| 2004/0203851 A1 | 10/2004 | Vetro et al. |
| 2004/0204133 A1 | 10/2004 | Andrew et al. |
| 2004/0204145 A1 | 10/2004 | Nagatomo |
| 2004/0209649 A1 | 10/2004 | Lord |
| 2004/0215793 A1 | 10/2004 | Ryan |
| 2004/0233224 A1 | 11/2004 | Ohba |
| 2004/0240649 A1 | 12/2004 | Goel |
| 2004/0240861 A1 | 12/2004 | Yeend |
| 2004/0259526 A1 | 12/2004 | Goris et al. |
| 2004/0267715 A1 | 12/2004 | Polson et al. |
| 2005/0010573 A1* | 1/2005 | Garg ............................. 707/10 |
| 2005/0010641 A1 | 1/2005 | Staack |
| 2005/0018853 A1 | 1/2005 | Lain et al. |
| 2005/0021395 A1 | 1/2005 | Luu |
| 2005/0021470 A1 | 1/2005 | Martin et al. |
| 2005/0033700 A1 | 2/2005 | Vogler |
| 2005/0050208 A1 | 3/2005 | Chatani |
| 2005/0060350 A1 | 3/2005 | Baum et al. |
| 2005/0060425 A1 | 3/2005 | Yeh et al. |
| 2005/0075908 A1 | 4/2005 | Stevens |
| 2005/0086697 A1 | 4/2005 | Haseltine |
| 2005/0091146 A1 | 4/2005 | Levinson |
| 2005/0091381 A1 | 4/2005 | Sunder |
| 2005/0102610 A1 | 5/2005 | Jie |
| 2005/0114357 A1 | 5/2005 | Chengalvarayan et al. |
| 2005/0119936 A1 | 6/2005 | Buchanan |
| 2005/0125397 A1 | 6/2005 | Gross et al. |
| 2005/0131752 A1 | 6/2005 | Gracie |
| 2005/0138369 A1 | 6/2005 | Lebovitz |
| 2005/0141709 A1 | 6/2005 | Bratton |
| 2005/0154608 A1 | 7/2005 | Paulson et al. |
| 2005/0160458 A1 | 7/2005 | Baumgartner |
| 2005/0193014 A1 | 9/2005 | Prince |
| 2005/0193054 A1 | 9/2005 | Wilson et al. |
| 2005/0195696 A1 | 9/2005 | Rekimoto |
| 2005/0203807 A1 | 9/2005 | Bezos et al. |
| 2005/0210009 A1 | 9/2005 | Tran |
| 2005/0210101 A1 | 9/2005 | Janik |
| 2005/0216341 A1 | 9/2005 | Agarwal |
| 2005/0216859 A1 | 9/2005 | Paek et al. |
| 2005/0222989 A1 | 10/2005 | Haveliwala et al. |
| 2005/0223039 A1 | 10/2005 | Kim et al. |
| 2005/0228680 A1 | 10/2005 | Malik |
| 2005/0234891 A1 | 10/2005 | Walther et al. |
| 2005/0235811 A1 | 10/2005 | Dukane |
| 2005/0239504 A1 | 10/2005 | Ishii et al. |
| 2005/0249216 A1 | 11/2005 | Jones |

| | | | | | | |
|---|---|---|---|---|---|---|
| 2005/0251440 | A1 | 11/2005 | Bednarek | 2007/0072631 A1 | 3/2007 | Mock et al. |
| 2005/0256867 | A1 | 11/2005 | Walther et al. | 2007/0073596 A1 | 3/2007 | Alexander et al. |
| 2005/0273465 | A1 | 12/2005 | Kimura | 2007/0074262 A1 | 3/2007 | Kikkoji et al. |
| 2005/0276570 | A1 | 12/2005 | Reed et al. | 2007/0083602 A1 | 4/2007 | Heggenhougen et al. |
| 2005/0289113 | A1 | 12/2005 | Bookstaff | 2007/0088687 A1 | 4/2007 | Bromm et al. |
| 2006/0015904 | A1 | 1/2006 | Marcus | 2007/0088801 A1 | 4/2007 | Levkovitz et al. |
| 2006/0018208 | A1 | 1/2006 | Nathan et al. | 2007/0088851 A1 | 4/2007 | Levkovitz et al. |
| 2006/0018209 | A1 | 1/2006 | Drakoulis et al. | 2007/0100690 A1 | 5/2007 | Hopkins |
| 2006/0020062 | A1 | 1/2006 | Bloom | 2007/0100805 A1 | 5/2007 | Ramer et al. |
| 2006/0020662 | A1 | 1/2006 | Robinson | 2007/0101373 A1 | 5/2007 | Bodlaender et al. |
| 2006/0026263 | A1 | 2/2006 | Raghavan et al. | 2007/0105536 A1 | 5/2007 | Tingo, Jr. |
| 2006/0031164 | A1 | 2/2006 | Kim | 2007/0106899 A1 | 5/2007 | Suzuki |
| 2006/0031327 | A1 | 2/2006 | Kredo | 2007/0113243 A1 | 5/2007 | Brey |
| 2006/0037039 | A1 | 2/2006 | Aaltonen | 2007/0117571 A1 | 5/2007 | Musial |
| 2006/0048059 | A1 | 3/2006 | Etkin | 2007/0118546 A1 | 5/2007 | Acharya |
| 2006/0059044 | A1 | 3/2006 | Chan | 2007/0136264 A1 | 6/2007 | Tran |
| 2006/0059495 | A1* | 3/2006 | Spector .......... 719/310 | 2007/0149208 A1 | 6/2007 | Syrbe et al. |
| 2006/0062094 | A1 | 3/2006 | Nathan et al. | 2007/0156677 A1 | 7/2007 | Szabo |
| 2006/0067296 | A1 | 3/2006 | Bershad | 2007/0157247 A1 | 7/2007 | Cordray et al. |
| 2006/0068845 | A1 | 3/2006 | Muller et al. | 2007/0161402 A1 | 7/2007 | Ng |
| 2006/0074750 | A1 | 4/2006 | Clark et al. | 2007/0202922 A1 | 8/2007 | Myllynen |
| 2006/0075019 | A1 | 4/2006 | Donovan et al. | 2007/0203790 A1 | 8/2007 | Torrens et al. |
| 2006/0075425 | A1 | 4/2006 | Koch et al. | 2007/0204061 A1 | 8/2007 | Chen |
| 2006/0080251 | A1 | 4/2006 | Fried | 2007/0244880 A1 | 10/2007 | Martin et al. |
| 2006/0080356 | A1 | 4/2006 | Burges et al. | 2007/0250429 A1 | 10/2007 | Walser |
| 2006/0091203 | A1 | 5/2006 | Bakker et al. | 2007/0250761 A1 | 10/2007 | Bradley et al. |
| 2006/0095511 | A1 | 5/2006 | Munarriz et al. | 2007/0255614 A1 | 11/2007 | Ourednik et al. |
| 2006/0095516 | A1 | 5/2006 | Wijeratne | 2007/0271286 A1 | 11/2007 | Purang |
| 2006/0100978 | A1 | 5/2006 | Heller | 2007/0290787 A1 | 12/2007 | Fiatal et al. |
| 2006/0106936 | A1 | 5/2006 | De Luca | 2007/0294096 A1 | 12/2007 | Randall |
| 2006/0112098 | A1 | 5/2006 | Renshaw et al. | 2008/0004046 A1 | 1/2008 | Mumick et al. |
| 2006/0117378 | A1 | 6/2006 | Tam et al. | 2008/0004948 A1 | 1/2008 | Flake |
| 2006/0123014 | A1 | 6/2006 | Ng | 2008/0004990 A1 | 1/2008 | Flake |
| 2006/0123052 | A1 | 6/2006 | Robbin et al. | 2008/0013537 A1 | 1/2008 | Dewey et al. |
| 2006/0129455 | A1 | 6/2006 | Shah | 2008/0027881 A1 | 1/2008 | Bisse |
| 2006/0135232 | A1 | 6/2006 | Willis | 2008/0032703 A1 | 2/2008 | Krumm et al. |
| 2006/0136344 | A1 | 6/2006 | Jones et al. | 2008/0032717 A1 | 2/2008 | Sawada et al. |
| 2006/0141923 | A1 | 6/2006 | Goss | 2008/0046317 A1 | 2/2008 | Christianson |
| 2006/0143236 | A1 | 6/2006 | Wu | 2008/0057917 A1 | 3/2008 | Oria |
| 2006/0155732 | A1 | 7/2006 | Momose | 2008/0070579 A1 | 3/2008 | Kankar et al. |
| 2006/0165571 | A1 | 7/2006 | Seon et al. | 2008/0071875 A1 | 3/2008 | Koff et al. |
| 2006/0168616 | A1 | 7/2006 | Candelore | 2008/0077264 A1 | 3/2008 | Irvin et al. |
| 2006/0173910 | A1 | 8/2006 | McLaughlin | 2008/0082467 A1 | 4/2008 | Meijer et al. |
| 2006/0173916 | A1 | 8/2006 | Verbeck Sibley et al. | 2008/0082686 A1 | 4/2008 | Schmidt et al. |
| 2006/0174008 | A1 | 8/2006 | Abanami | 2008/0109378 A1 | 5/2008 | Papadimitriou |
| 2006/0194595 | A1 | 8/2006 | Myllynen et al. | 2008/0123856 A1 | 5/2008 | Won |
| 2006/0195462 | A1 | 8/2006 | Rogers | 2008/0130547 A1 | 6/2008 | Won |
| 2006/0195513 | A1 | 8/2006 | Rogers et al. | 2008/0132215 A1 | 6/2008 | Soderstrom |
| 2006/0195514 | A1 | 8/2006 | Rogers et al. | 2008/0133601 A1 | 6/2008 | Cervera et al. |
| 2006/0195515 | A1 | 8/2006 | Beaupre et al. | 2008/0155057 A1 | 6/2008 | Khedouri et al. |
| 2006/0195516 | A1 | 8/2006 | Beaupre | 2008/0155588 A1 | 6/2008 | Roberts et al. |
| 2006/0195521 | A1 | 8/2006 | New et al. | 2008/0195438 A1 | 8/2008 | Manfredi |
| 2006/0195789 | A1 | 8/2006 | Rogers | 2008/0195468 A1 | 8/2008 | Malik |
| 2006/0195790 | A1 | 8/2006 | Beaupre | 2008/0220855 A1 | 9/2008 | Chen et al. |
| 2006/0200460 | A1 | 9/2006 | Meyerzon et al. | 2008/0243619 A1 | 10/2008 | Sharman et al. |
| 2006/0200461 | A1 | 9/2006 | Lucas et al. | 2008/0270221 A1 | 10/2008 | Clemens et al. |
| 2006/0204601 | A1 | 9/2006 | Palu | 2008/0294523 A1 | 11/2008 | Little |
| 2006/0206586 | A1 | 9/2006 | Ling et al. | 2008/0301303 A1 | 12/2008 | Matsuoka |
| 2006/0242129 | A1 | 10/2006 | Libes | 2009/0024504 A1 | 1/2009 | Lerman et al. |
| 2006/0253874 | A1 | 11/2006 | Stark et al. | 2009/0024510 A1 | 1/2009 | Chen et al. |
| 2006/0265421 | A1 | 11/2006 | Ranasinghe et al. | 2009/0048957 A1 | 2/2009 | Celano |
| 2006/0276170 | A1 | 12/2006 | Radhakrishnan et al. | 2009/0073174 A1 | 3/2009 | Berg et al. |
| 2006/0276213 | A1 | 12/2006 | Gottschalk et al. | 2009/0076939 A1 | 3/2009 | Berg et al. |
| 2006/0277098 | A1 | 12/2006 | Chung et al. | 2009/0076974 A1 | 3/2009 | Berg et al. |
| 2006/0282311 | A1 | 12/2006 | Jiang | 2009/0083307 A1 | 3/2009 | Cervera et al. |
| 2006/0282328 | A1 | 12/2006 | Gerace et al. | 2009/0089222 A1 | 4/2009 | Ferreira de Castro et al. |
| 2006/0286963 | A1 | 12/2006 | Koskinen et al. | 2009/0106085 A1 | 4/2009 | Raimbeault |
| 2006/0286964 | A1 | 12/2006 | Polanski et al. | 2009/0210415 A1 | 8/2009 | Martin et al. |
| 2006/0288044 | A1 | 12/2006 | Kashiwagi et al. | 2009/0275315 A1 | 11/2009 | Alston |
| 2006/0288124 | A1 | 12/2006 | Kraft et al. | 2009/0276368 A1 | 11/2009 | Martin et al. |
| 2006/0288367 | A1 | 12/2006 | Swix et al. | 2010/0161595 A1 | 6/2010 | Martin et al. |
| 2007/0003064 | A1 | 1/2007 | Wiseman | 2010/0169328 A1 | 7/2010 | Hangartner |
| 2007/0004333 | A1 | 1/2007 | Kavanti | 2011/0022475 A1 | 1/2011 | Inbar et al. |
| 2007/0016507 | A1 | 1/2007 | Tzara | 2011/0258049 A1 | 10/2011 | Ramer et al. |
| 2007/0043829 | A1 | 2/2007 | Dua | | | |
| 2007/0047523 | A1 | 3/2007 | Jiang | FOREIGN PATENT DOCUMENTS | | |
| 2007/0055439 | A1 | 3/2007 | Denker | DE 10061984 | 6/2002 | |
| 2007/0055440 | A1 | 3/2007 | Denker | EP 0831629 | 3/1998 | |
| 2007/0061568 | A1 | 3/2007 | Lee | EP 1043905 | 10/2000 | |

| | | |
|---|---|---|
| EP | 1050833 | 11/2000 |
| EP | 1073293 | 1/2001 |
| EP | 1083504 | 3/2001 |
| EP | 1107137 | 6/2001 |
| EP | 1109371 | 6/2001 |
| EP | 1195701 | 4/2002 |
| EP | 1220132 | 7/2002 |
| EP | 1231788 | 8/2002 |
| EP | 1239392 | 9/2002 |
| EP | 1280087 | 1/2003 |
| EP | 1320214 | 6/2003 |
| EP | 1365604 | 11/2003 |
| EP | 1408705 | 4/2004 |
| EP | 1420388 | 5/2004 |
| EP | 1455511 | 9/2004 |
| EP | 1509024 | 2/2005 |
| EP | 1528827 | 5/2005 |
| EP | 1542482 | 6/2005 |
| EP | 1548741 | 6/2005 |
| EP | 1587332 | 10/2005 |
| EP | 1615455 | 1/2006 |
| EP | 1633100 | 3/2006 |
| EP | 1677475 | 7/2006 |
| EP | 1772822 | 4/2007 |
| GB | 2369218 | 5/2002 |
| GB | 2372867 | 9/2002 |
| GB | 2380364 | 4/2003 |
| GB | 2386509 | 9/2003 |
| GB | 2406996 | 4/2005 |
| GB | 2414621 | 11/2005 |
| GB | 2416887 | 2/2006 |
| GB | 2424546 | 9/2006 |
| JP | 11052965 | 2/1999 |
| JP | 2002108351 | 4/2002 |
| JP | 2002140272 | 5/2002 |
| JP | 2002320203 | 10/2002 |
| JP | 2003255958 | 9/2003 |
| JP | 2004221999 | 8/2004 |
| JP | 2005027337 | 1/2005 |
| JP | 2007087138 | 4/2007 |
| JP | 2007199821 | 8/2007 |
| KR | 2002025579 | 4/2002 |
| WO | 89/10610 | 11/1989 |
| WO | 96/24213 | 8/1996 |
| WO | 00/44151 A2 | 7/2000 |
| WO | 00/70848 | 11/2000 |
| WO | 01/22748 | 3/2001 |
| WO | 01/31497 | 5/2001 |
| WO | 01/44977 | 6/2001 |
| WO | 01/50703 | 7/2001 |
| WO | 01/52161 | 7/2001 |
| WO | 01/57705 | 8/2001 |
| WO | 01/58178 A2 | 8/2001 |
| WO | 01/63423 | 8/2001 |
| WO | 01/65411 | 9/2001 |
| WO | 01/69406 | 9/2001 |
| WO | 01/71949 | 9/2001 |
| WO | 01/72063 | 9/2001 |
| WO | 2004/093044 | 10/2001 |
| WO | 01/91400 | 11/2001 |
| WO | 01/93551 | 12/2001 |
| WO | 01/97539 | 12/2001 |
| WO | 02/09431 | 1/2002 |
| WO | 02/23489 | 3/2002 |
| WO | 02/31624 | 4/2002 |
| WO | 02/35324 | 5/2002 |
| WO | 02/44989 | 6/2002 |
| WO | 02/50632 | 6/2002 |
| WO | 02/054803 A1 | 7/2002 |
| WO | 02/069585 | 9/2002 |
| WO | 02/069651 | 9/2002 |
| WO | 02/075574 | 9/2002 |
| WO | 02/084895 | 10/2002 |
| WO | 02/086664 | 10/2002 |
| WO | 02/091238 | 11/2002 |
| WO | 02/096056 | 11/2002 |
| WO | 02/100121 | 12/2002 |
| WO | 03/015430 A1 | 2/2003 |
| WO | 03/019845 | 3/2003 |
| WO | 03/019913 | 3/2003 |
| WO | 03/024136 | 3/2003 |
| WO | 03/036541 | 5/2003 |
| WO | 03/049461 | 6/2003 |
| WO | 03/051051 | 6/2003 |
| WO | 03/088690 A1 | 10/2003 |
| WO | 2004/057578 | 7/2004 |
| WO | 2004/070538 | 8/2004 |
| WO | 2004/084532 | 9/2004 |
| WO | 2004/086791 | 10/2004 |
| WO | 2004/100470 | 11/2004 |
| WO | 2004/100521 | 11/2004 |
| WO | 2004/102993 | 11/2004 |
| WO | 2004/104867 | 12/2004 |
| WO | 2005/013114 | 2/2005 |
| WO | 2005/020578 | 3/2005 |
| WO | 2005/029769 | 3/2005 |
| WO | 2005/073863 | 8/2005 |
| WO | 2005/076650 | 8/2005 |
| WO | 2005/115107 | 12/2005 |
| WO | 2006/002869 | 1/2006 |
| WO | 2006/005001 | 1/2006 |
| WO | 2006/016189 | 2/2006 |
| WO | 2006/024003 | 3/2006 |
| WO | 2006/027407 | 3/2006 |
| WO | 2006/040749 | 4/2006 |
| WO | 2006/052837 | 5/2006 |
| WO | 2006/075032 | 7/2006 |
| WO | 2006/093284 | 9/2006 |
| WO | 2006/104895 | 10/2006 |
| WO | 2006/114451 | 11/2006 |
| WO | 2006/119481 | 11/2006 |
| WO | 2007/001118 | 1/2007 |
| WO | 2007/002025 | 1/2007 |
| WO | 2007/038806 | 4/2007 |
| WO | 2007/060451 | 5/2007 |
| WO | 2007/075622 | 7/2007 |
| WO | 2007/091089 | 8/2007 |
| WO | 2007/092053 | 8/2007 |
| WO | 2007/134193 | 11/2007 |
| WO | 2008/013437 | 1/2008 |
| WO | 2008/024852 | 2/2008 |
| WO | 2008/045867 | 4/2008 |
| WO | 2008/147919 | 12/2008 |
| WO | 2009/088554 | 7/2009 |
| WO | 2009/149046 | 12/2009 |

OTHER PUBLICATIONS

PCT/US09/42002; Filed Apr. 28, 2009; International Search Report and Written Opinion; Jun. 2009.
PCT/US09/45725; International Search Report dated Jul. 15, 2009; Applicant Strands, Inc.
PCT/US09/45911; Filed Jun. 2, 2009; International Search Report dated Jul. 15, 2009.
Web page, www.akoo.com/Akoo/, Web Page, Akoo, Pick the Music, Waiting in the line at the Theme Park, Introducing the m-Venue™ platform, (Sep. 7, 2006).
Web Page, www.alwayson-network.com/comments.php?id=P12663 0 37 0 C, Web Page, Not Your Average Jukebox, on Hollywood 100 contender Ecast uses broadband to bring the digital media experience to your watering hole. (Sep. 7, 2006).
www.ecastinc.com/music_licensing.html, Web Page, Ecast Network, interactive entertainment network, Music/ Licensing, Sep. 7, 2006.
www.roweinternational.com/jukeboxes_dia.html, Web Page, Digital Internet Access Jukeboxes, Rowe International, Sep. 7, 2006.
www.touchtunes.com, Web Page, Touchtunes, Turn your Rowe 100A's and 100B's into touch tunes Digital Jukeboxes—Bose, Sep. 7, 2006.
PCT/ES2005/000213 Written Opinion of the International Searching Authority dated Jan. 12, 2006.
PCT/US2006/004257 European Search Report, Oct. 23, 2009.
IEEE, no matched results, Nov. 11, 2009, 1 page.
PCT/ES2005/000213 International Preliminary Report on Patentability (Ch II) Report Dated Nov. 15, 2007.

PCT/US07/068708; Filed May 10, 2007; International Search Report; Dec. 7, 2007.
PCT/US09/68604 International Search Report and Written Opinion of the International Searching Authority; dated Feb. 17, 2010.
www.axcessnews.com/modules/wfsection/article.php?articleid=8327, Web Page, Feb. 24, 2006, Maintenance Fees, Digital Music Sales Triple to $1.1 Billion in 2005.
PCT/US2006/034218; USPTO Search Authority; PCT International Search Report; Feb. 9, 2007.
PCT/ES2005/00003 Written Opinion of the International Preliminary Examining Authority dated Mar. 19, 2007.
PCT/US2006/048330; International Bureau; PCT Search Report and Written Opinion; Mar. 20, 2008; 10 pages.
www.bmi.com/news/200403/20040324b.asp, Web Page, BMI™ Figures Don't Lie, Mar. 24, 2004, Touch Tunes Signs License Agreement for BMI Music in Digital Jukeboxes.
PCT/US06/38769 International Search Authority; Mar. 25, 2008; 3 pages.
Stolowitz Ford Cowger LLPC, List of Related Cases, May 20, 2010.
PCT/ES2005/00003 International Preliminary Report on Patentability (Ch II) Report dated May 22, 2007.
www.rfidjournal.comfarticle/articleviewf1619f1f1,Web Page, RFID brings messages to Seattle side walks on RFID system being deployed next week will send marketing and assistive information to users carrying active RFID tags RFID Journal. Dated May 26, 2004.
PCT/US2006/003795; International Search Report and Written Opinion of International Application, dated May 28, 2008.
PCT/ES2005/00003 Written Opinion of the International Searching. Authority Report dated Jun. 10, 2005.
Treemap, University of Maryland, http://www.cs.umd.edu/hcil/treemap/ , last updated Aug. 5, 2003, 4 pages.
International Search Report PCT/US2009/051233; Sep. 4, 2009; Strands, Inc.
"Communications of the ACM" Dec. 1992, vol. 35, No. 12 at pp. 26-28 (Introduction to special issue regarding Workshop on High Performance Information Filtering, Morristown, N.J. Nov. 1991)., Dec. 26-28, 1992.
"Architecting Personalized Delivery of Multimedia Information", Architecting Personalized Delivery of Multimedia Information,: Communications of the ACM (Dec. 1992)., Dec. 1992.
"Lessons from LyricTimeTM: A Prototype Multimedia System", "Lessons from LyricTimeTM: A Prototype Multimedia System" 4th IEEE.ComSoc International Workshop on Multimedia Communications (Apr. 1992).
"Baugher et al", The Secure Real-Time Transport Protocol (SRTP) , Mar. 2004, Network Working Group Request for Comments:3711, p. 1-53.
"Communication Pursuant to Article 94(3) EPC dated Oct. 19, 2009", European Patent Application No. 08 153 258.2 (5 pages).
"Communication Pursuant to Article 94(3) EPC dated Feb. 10, 2009", European Patent Office in related European Patent Application.No. 07 118 601.9 (3 pages).
"Communication Pursuant to Article 94(3) EPC issued Jun. 25, 2009", European Patent Application No. 08 159 331.1 (3 pages).
"Digital Rights Management in the Mobile Environment", Y.Raivio &S.Luukkainen, Proceedings of the International Conference on E-Business and Telecommunication, ICETE 2006, Aug. 7, 2006.
"DRM Architecture Approved Version 2.0", OMA-AD-DRM-V2_0-20060303-A (Open Mobile Alliance, Ltd.), Mar. 3, 2006.
"English translation of First Office Action issued by State Intellectual Property Office of People's Republic of China", Chinese Applicatio No. 200480033236.X (8 pages), Dec. 4, 2009.
"English Translation of First Office Action issued by the Chinese Patent Office", Chinese Application No. 200480019404.X, Aug. 19, 2008.
"European Examination Report dated Nov. 3, 2008", European Patent Application EP 08159333.7, Nov. 3, 2008.
"European Examination Report dated Nov. 3, 2008", European Patent Application No. EP 08159331.1.
"European Search Report Nov. 5, 2008", European Patent Application No. EP 08159331.1.
"European Search Report dated Nov. 5, 2008", European Patent Application No. EP 08159333.7.

"European Search Report dated Apr. 7, 2010", European Patent Application No. EP 10153358.6 (6 pages).
"European Search Report dated Jul. 18, 2008", European Patent Office in related EPO Application No. 08 15 3658.
"European Search Report dated Jul. 18, 2008", European Patent Office in related EPO Application No. EP 08 15 3656.
"European Search Report dated Jul. 22, 2008", European Patent Office in related EPO Application No. EP 08153651.8.
"European Search Report dated Jul. 23, 2008", European Patent Office in related EPO Application No. EP 08153654.2.
"European Search Report dated Apr. 18, 2008", European Patent No. 08101188.4.
"European Search Report dated Mar. 19 2008", European Patent Office.In counterpart European Application No. EP 07 11 8601.
"Extended European Search Report dated Dec. 2, 2008", European Patent Office in counterpart EPO Application No. EP 07120620.5.
"Extended European Search Report dated Dec. 29, 2008", European Patent Office in counterpart EPO Application No. EP 07120480.4.
"Ghassan Chaddoud et al.", Dynamic Group Communication Security, pp. 49-56, IEEE 2001, 2001.
"International Search Report and Written Opinion of the International Search Authority", International Patent Application No. PCT/EP2008/051229, May 8, 2008.
"International Search Report and Written Opinion of the International Searching Authority", International Application PCT/EP2008/054911, Nov. 11, 2008.
"International Search Report for International Application", PCT/FI2006/050467, dated Jul. 25, 2007.
"International Search Report in PCT Application No. PCT/GB2004/003890", Apr. 5, 2005.
"New Music Recommendation System is Based on FOAF Personal Profiling", "New Music Recommendation System is Based on FOAF Personal Profiling," www.masternewmedia.org/music_recommendation/music_recommendation_system_FOAF, Oct. 1, 2005.
"Office Action (Notice of Allowance)", USPTO dated Jun. 11, 2009 in U.S. Appl. No. 12/079,312 (5 pages).
"Office Action dated Jan. 28, 2009", U.S. Appl. No. 10/571,709 (29 pages).
"Office Action dated Mar. 22, 2010", U.S. Appl. No. 12/431,961 (19 pages).
"Office Action dated Apr. 6, 2009 in related U.S. Appl. No.12/156,335 (17 pages)".
"Office Action dated Jun. 21, 2010", U.S. Appl. No. 10/555,543 (17 pages).
"Office Action dated Apr. 6, 2009", U.S. Appl. No.10/555,543 (14 pages).
"Office Action dated Apr. 9, 2009", U.S. Appl. No.12/002,452 (20 pages).
"Office Action dated Feb. 5, 2009", U.S. Appl. No. 12/079,312 (12 pages).
"Office Action dated Mar. 9, 2001", Issued in related U.S. Appl. No. 12/477,766 (27 pages).
"Office Action issued Apr. 22, 2010", U.S. Appl. No. 12/156,335 (16 pages).
"Office Action issued by USPTO dated Nov. 20, 2009", U.S. Appl. No. 10/571,709 (20 pages).
"Office Action issued from the USPTO dated Nov. 4, 2010", U.S. Appl. No. 12/431,961 (21 pages).
"Office Action issued from the USPTO dated Sep. 23, 2009", U.S. Appl. No. 12/156,335 (26 pages).
"Office Action issued from USPTO", in related U.S. Appl. No. 10/555,543 (19 pages), Oct. 20, 2009.
"Office Action Issued from USPTO dated Oct. 5, 2009", U.S. Appl. No. 10/571,709 (26 pages).
"Office Action issued from USPTO dated Aug. 14, 2009", U.S. Appl. No. 12/431,961 (12 pages).
"Office Action Issued Jan. 12, 2011 by the USPTO", U.S. Appl. No. 12/484,454 (10 pages).
"Office Action Issued Mar. 29, 2011 by the USPTO", U.S. Appl. No. 10/555,543 (17 pages).
"Office Action Mar. 24, 2009", U.S. Appl. No. 12/156,335.
"Official Action from the British Intellectual Property Office Oct. 9, 2008", British Application No. GB0712281.5 (5 pages).

"Official Action from the European Patent Office Apr. 1, 2009", European Application No. 08 717 428.0 (4 pages).

"PCT International Search Report (Form PCT/ISA/210)", International Application PCT/EP2008/052678, Jul. 4, 2008.

"PCT International Search Report issued by PCT International Searching Authority", International Searching Authority in connection with the related PCT International Application No. PCT/NL2004/000335 (2 pages), Sep. 24, 2004.

"PCT International Preliminary Report on Patentability and Written Opinion Issued by the International Searching Authority PCT/EP2008/054911 dated Oct. 27, 2009 (6 pages)".

"Schulzrinne et al, "RTP: A Transport Protocol for Real-Time Applications"", Network Working Group Request for Comments: 3550, p. 1-98, Jul. 1, 2003.

"Search Report under Section 17 dated May 20, 2008", British Patent Office in counterpart UK Application No. GB0807153.2.

"Social Networking Meets Music Listening: Mecora Launches Radio 2.0", "Social Networking Meets Music Listening: Mecora Launches Radio 2.0," www.masternewsmedia.org/news/2006/04/13/social_networking_meets_music listening.htm, Apr. 13, 2006.

"Text of Second Office Action (English Translation)", Jun. 12, 2009 in corresponding Chinese Patent Application No. 200480019404.X (2 pages).

"U.K. Combined Search and Examination Report under Sections 17 and 18(3)", U.K. Application No. GB0802177.6, May 13, 2008.

"U.K. Further Search Report under Section 17", U.K. Application No. GB0710853.3, Dec. 5, 2007.

"U.K. Patent Office Examination Report under Section 18(3)", U.K. Application No. GB0315984.5, Mar. 29, 2006.

"U.K. Search Report under Section 17", U.K. Application No. GB0710853.3, Oct. 3, 2007.

"U.K. Search Report under Section 17 dated Mar. 3, 2005", U.K. Application Serial No. GB0420339.4, Mar. 3, 2005.

"United Kingdom Search Report under Section 17", GB 0712281.5 (2 pages), Oct. 24, 2007.

"Wallner et al, "Key Management for Multicast: Issues and Architectures"", Jun. 1999, National Security Agency Networking Group Request for Comments: 2627, p. 1-22 (22 pages), Jun. 1, 1999.

Alvear, Jose , ""Risk-Free Trial Streaming Media Delivery Tools,"", Alvear, Jose, "Risk-Free Trial Streaming Media Delivery Tools," Streaming Media.com; www.streamingmedia.com/ article.ap?id=5768, Jun. 30, 2000.

Apple, , "iTunes 4.2 User Guide for Windows", Apple: iTunes 4.2 User Guide for Windows; Dec. 2003; retrieved from the internet: URL: http://www2.austin.cc.tx. us/tcm/projects/itunes.pdf; pp. 10,17-19., Dec. 2003, 10;17-19.

Aucouturier, J et al., "Scaling up music playlist generation", Aucouturier J et al: "Scaling up music playlist generation", Multimedia and Expo, 2002. ICME '02. Proceedings. 2002 IEEE Internatio Nal Conference on Lausanne, Switzerland Aug. 26-29, 2002, Piscataway, NJ, USA,IEEE, US, vol. 1, pp. 105, 105-108.

Baluja, S et al., ""Video Suggestion and Discovery for YouTube: Taking Random Walks Througj the View Graph"", S. Baluja, R. Seth, D. Sivakumar, Y. Jing, J. Yagnik, S. Kumar, D. Ravichandran, and M. Aly, "Video Suggestion and Discovery for YouTube: Taking Random Walks Through the View Graph". In WWW '08: Proceedings of the 17th international conference on World, 2008, 895-904.

Belkins, et al., ""Information Filtering and Information Retrieval: Two Sides of the Same Coin?"", Belkins, et al., "Information Filtering and Information Retrieval: Two Sides of the Same Coin?", Communications of the ACM (Dec. 1992).

Bender, et al., ""Newspace: Mass Media and Personal Computing,"", Bender, et al., "Newspace: Mass Media and Personal Computing," Proceedings of USENIX, Conference, pp. 329-348 (Summer 1991)., Summer 1991, 329-348.

Bender, , ""Twenty Years of Personalization: All about the Daily Me,"", Bender, "Twenty Years of Personalization: All about the Daily Me," Educause Review (Sep./Oct. 2002), 2002.

Bollen, Johan et al., "Toward alernative metrics of journal impact: a comparison of download and citation data", Toward alernative metrics of journal impact: a comparison of download and citation data, Johan Bollen, Herbert Van de Sompel, Joan Smith, Rick Luce, Google.com, 2005, pp. 1-2., 2005, 1-2.

Bunzel, Tom , "Easy Digital Music", Tom Bunzel, "Easy Digital Music," Que Publisher, Aug. 18, 2004, Chapters 5 and 8.

Cano, Pedro et al., "On the Use of FastMap for Audio Retrieval and Browsing", Cano, Pedro et al., On the Use of FastMap for Audio Retrieval and Browsing, The International Conference on Music Information Retrieval and Related Activities (ISMIR 2002), Paris, France, Oct. 2002,2 pages, 2002.

Carlosn, et al., "Internet Banking Market Developments and Regulatory Issues in the New Economy: What Changed, and the Challenges for Economic Policy . .", Carlson et al. "Internet Banking Market Developments and Regulatory Issues in the New Economy: What Changed, and the Challenges for Economic Policy . . "; May 2001; htlp:l/www.occ.gov/netbankiSGEC2000.pdf., May 2001.

Chao-Ming, et al., "Design and Evaluation and mProducer: a Mobile Authoring Tool for Personal Experience Computing", Chao-Ming et al. (Chao-Ming), Design and Evaluation and mProducer: a Mobile Authoring Tool for Personal Experience Computing [online], MUM 2004, College Park, Maryland, USA, Oct. 27-29, 2004 [retrieved on Dec. 17, 2010]. [http://citeseerx.ist.psu.edu/vie, [http://citeseerx.ist.psu.edu/viewdoc/download?doi=10.1.1.131.2933&rep=rep1&type=pdf].

Connell, Lain et al., "Ontological Sketch Models: Highlighting User-System Misfits", Connell, lain et al., Ontological Sketch Models: Highlighting User-System Misfits, in P. Palanque, E. O'Neill and P. Johnson, editors, Proceedings of Human Computer Interaction (HCI) Bath, England, Sep. 2003, London Springer, pp. 1-16., Sep. 2003, 1-16.

Das, A et al., ""Google News Personalization: Scalable Online Collaborative Filtering"", A. Das, M. Datar, A. Garg, and S. Rajaram. "Google News Personalization: Scalable Online Collaborative Filtering". In WWW'07: Proceedings of the 16th international conference on World Wide Web, pp. 271-280, New York, NY, USA, 2007. ACM Press., 2007, 271-280.

Dean, J et al., ""MapReduce: Simplied Data Processing on Large Clusters"", Dean, J. and Ghemawat, S. "MapReduce: Simplied Data Processing on Large Clusters". Commun. ACM, 51(1):107-113, 2008., 2008, 107-113.

Dempster, Y et al., ""Maximum Likelihood from Incomplete Data via the EM Algorithm"", Y. Dempster, N. Laird, and D. Rubin. "Maximum Likelihood from Incomplete Data via the EM Algorithm". Jour. of the Royal Stat. Soc., Ser. B., 39:1047-1053, 1977., 1977, 1047-1053.

Deshpande, Mukund et al., "Item-Based Top-N Recommendation Algoriths", Deshpande, Mukund, et al., "Item-Based Top-N Recommendation Algorithms," ACM Transactions on Information Systems, 22:1 (Jan. 2004), pp. 143-177., 143-177.

Hofmann, T. "Latent Semantic Models for Collaborative Filtering", Hofmann, T. "Latent Semantic Models for Collaborative Filtering", ACM Transactions on Information Systems, 22:89-115,2004., 2004, 89-115.

Hofmann, T , "Unsupervised Learning by Probabilistic Latent Semantic Analysis", Hofmann, T. "Unsupervised Learning by Probabilistic Latent Semantic Analysis". Mach. Learn., 42:177-196, 2001., 2001, 177-196.

Indyk, P et al., "Low-Distortion Embeddings of Finite Metric Spaces", Indyk, P. and Matousek, J. "Low-Distortion Embeddings of Finite Metric Spaces". In Handbook of Discrete and Computational Geometry, pp. 177-196. CRC Press, 2004., 2004, 177-196.

Jacucci, Giulio et al., "IP City, Integrated Project on Interaction and Presence on Urban Environments-Demonstrators on Large-Scale Events Applications", IP City, Integrated Project on Interaction and Presence on Urban Environments-Demonstrators on Large-Scale Events Applications; ipcity.eu; Giulio Jacucci, John Evans, Tommi Ilmonen; pp. 1-37; Feb. 9, 2007., 1-37.

Lazar, N A. , "Bayesian Empirical Likelihood", N.A. Lazar; Bayesian Empirical Likelihood; Technical Report, Carnegi Mellon University, Department of Statistics, 2000; 26 pages., 2000.

Levine, Robert , "New Model for Sharing: Free Music with Ads", The New York Times (On-Line Edition), Apr. 23, 2007.

""The Electronic Broadsheet—All the News That Fits the Display,"", Lie, "The Electronic Broadsheet—All the News That Fits the Display," MIT Master's Thesis, pp. 1-96 (Jun. 1991)., 1-96.

Lippman, et al., ""News and Movies in the 50 Megabit Living Room,"", Lippman, et al., "News and Movies in the 50 Megabit Living Room," IEEEIIEICE, Global Telecommunications Conference, pp. 1976-1981 (Nov. 15,1987)., 1976-1981.
Loeb, Shoshana, "Delivering Interactive Multimedia Documents over Networks", Delivering Interactive Multimedia Documents over Networks; Shoshana Loeb; IEEE Communications Magazine; May 1992; 8 pages.
Logan, Beth, "A Music Similarity Function Based on Signal Analysis", Logan, Beth et al., A Music Similarity Function Based on Signal Analysis, IEEE International Conference on Multimedia and Expo (ICME), Tokyo, Japan, Aug. 2001, IEEE Press, pp. 952-955., 952-955.
Logan, Beth, "Content-Based Playlist Generation: Exploratory Experiments", Logan, Beth, Content-Based Playlist Generation: Exploratory Experiments, The International Conference on Music Information Retrieval and Related Activities (ISMIR 2002), Paris, France, Oct. 2002,2 pages.
M. O'Connor, et al., "PolyLens: A Recommender System for Groups of Users", PolyLens: A Recommender System for Groups of Users; M. O'Connor, D. Cosley, J.A. Konstan, J. Riedl; European Conference on Computer Supported Co-Operative Work at Bonn, Germany; Published 2001; pp. 199-218., 2001, 199-218.
Maidin, Donncha et al., "The Best of Two Worlds: Retrieving and Browsing", Maidin, Donncha 0 et al., The Best of Two Worlds: Retrieving and Browsing, Proceedings of the COST G-6 Conference on Digital Audio Effects (DAFX-00), Verona, Italy, Dec. 7-9, 2000,4 pages.
McCarthy, et al., Augmenting the Social Space of an Academic Conference; McCarthy, et al. Information School, University of Washington and Department of Computer Science and Engineering, University of Minnesota; pp. 1-10; Nov. 6-10, 2004. Retrieved from the Internet: <URL, 1-10.
Notess, Mark et al., Notess, Mark et al., Variations2: Toward Visual Interface for Digital Music Libraries, Second International Workshop on Visual Interfaces to Digital Libraries, 2002, 6 pages., 2002.
Orwant, Jon, ""Appraising the User of User Models: Doppelganger's Interface,"", Jon Orwant, "Appraising the User of User Models: Doppelganger's Interface," in: A. Kobsa and D. Litman (eds.), Proceeding of the 4th International Conference on User Modeling (1994)., 1994.
Orwant, Jonathan L., ""Doppelganger Goes to School: Machine Learning for User Modeling,"", Jonathan L. Orwant, "Doppelganger Goes to School: Machine Learning for User Modeling," MIT Master of Science Thesis (Sep. 1993).
Orwant, Jonathan L., ""Doppelganger: A User Modeling System,"", Jonathan L. Orwant, "Doppelganger: aA User Modeling System," MIT Bachelor's Thesis (Jun. 1991).
Pachet, Francois, "A Taxonomy of Musical Genres, Content-Based Multimedia Information Access Conference (RIAO)", Pachet, Francois, A Taxonomy of Musical Genres, Content-Based Multimedia Information Access Conference (RIAO), Paris, Apr. 2000, 8 pages.
Paek, Tim et al., Toward University Mobile Interaction for Shared Displays; Tim Paek, et al.; Microsoft Research, Redmond, WA; pp. 1-4; Nov. 6-10, 2004., 1-4.
Pampalk, Elias et al., "Content-based Organization and Visualization of Music Archives", Pampalk, Elias et al., Content-based Organization and Visualization of Music Archives, ACM Multimedia, Juan les Pins, France, Dec. 2002, pp. 570-579., 570-579.
Pauws, Steffen et al., "PATS: Realization and User Evaluation of an Automatic Playlist Generator", Dauws, Steffen et al., PATS: Realization and User Evaluation of an Automatic Playlist Generator, The International Conferences on Music Information Retrieval and Related Activities (ISMIR 2002), Paris, France, Oct. 2002,9 pages.
Platt, John C. et al., "Learning a Gaussian Process Prior for Automatically Generating Music Playlists", Platt, John C. et al., "Learning a Gaussian Process Prior for Automatically Generating Music Playlists," Microsoft Corporation {plan, cburgess, sswenson, chriswea}@microsoft.com, alcez@cs.berkeley.edu, 2002; pp. 1-9., 2002, 1-9.

Platt, John S., "Fasting Embedding of Sparse Music Similarity Graphs", Platt, John S., "Fasting Embedding of Sparse Music Similarity Graphs," Microsoft Corporation, {jplatt@microsoft.com}; 2004., 2004.
Rauber, Andreas et al., "The SOM-enhanced JukeBox: Organization and visualization of Music Collections Based on Perceptual Models", Rauber, Andreas et al., The SOM-enhanced JukeBox: Organization and Visualization of Music Collections Based on Perceptual Models, Journal of New Music Research, vol. 32, Nov. 2, 2003, pp. 193-210., 193-210.
Rudstrom, Asa, Co-Construction of Hybrid Spaces; Asa Rudstrom; A Dissertation submitted to the University of Stockholm in partial fulfillment of the requirements for the Degree of Doctor of Philosophy; Department of Computer and Systems Sciences Stockholm University and, Nov. 2005, 1-69.
Scheible, Jurgen et al., MobiLenin—Combining a Multi-Track Music Video, Personal Mobile Phones and a Public Display into Multi-User Interactive Entertainment; Jurgen Scheible, et al. Media Lab, University of Art and Design, Helsinki, Finland; pp. 1-10; Nov. 6-10, 2005. Retriev, 1-10.
Scihira, I, ""A Characterization of Singular Graphs"", Scihira, I. "A Characterization of Singular Graphs". Electronic Journal of Linear Algebra, 16:451-462,2007., 2007, 451-462.
Shneiderman, Ben, "Tree Visualization with Tree-Maps: 2-d Space-Filling Approach", Shneiderman, Ben, Tree Visualization with Tree-Maps: 2-d Space-Filling Approach, ACM Transactions on Graphics, vol. 11, No. 1, Jan. 1992, pp. 92-99., 1992, pp. 92-99.
Shneiderman, Ben, "Treemaps for Space-Contrained Visualization of Hierarchies", Shneiderman, Ben, Treemaps for Space-Contrained Visualization of Hierarchies, http://www.sc.umd.edu/heil/treemap-history, last updated Apr. 28, 2006, 16 pages.
Smart Computing, "The Scoop on File-Sharing Services", Smart Computing, "The Scoop on File-Sharing Services," Dec. 2000, vol. 11, Issue 12; pp. 30-33 in printed issue. Available at www.smartcomputing.com/editorial/article.asp?article=articles%2F2000%Fs1112%2FOBs12.asp., Dec. 2000, 30-33.
Strands Business Solutions, "Integration Document v.2.0", Strands Business Solutions. "Integration Document v.2.0"; Published May 2008; [online retrieved on Jan. 21, 2010] Retrieved from the internet <URL: http://recommender.strands.com/doc/SBS-Integration-Document.pdf>; entire document—18 pages.
Sun, Jimeng et al., "Incremental tensor analysis: theory and applications", Incremental tensor analysis: theory and applications, Jimeng Sun, Dacheng Tao, Spiros Papadimitriou, Philip Yu, Christos Faloutsos, ACM, Oct. 2008, pp. 1-37, 1-37.
The Trustees of Indiana Univ., , The Trustees of Indiana University, Variations2, The Indiana University Digital Music Library, http://dml.indiana.edu/, last updated May 11, 2005, 1 page.
Thompson, John, ""A Graphic Representation of Interaction With the Nexis News Database,"", John Thompson, "A Graphic Representation of Interaction With the NEXIS News Database," MIT Thesis (May 1983).
Tzanetakis, George et al., "A Prototype Audio Browser-Editor Using a Large Scale Immersive Visual and Audio Display", Tzanetakis, George et al., MARSYAS3D: A Prototype Audio Browser-Editor Using a Large Scale Immersive Visual and Audio Display, Proceedings of the 2001 International Conference on Auditory Display, Espoo, Finland, Jul./Aug. 2001, 5 pages., 2001.
Wolfers, Justin et al., Wolfers, Justin and Zitzewitz, Eric, Prediction Markets, Journal of Economic Perspectives, Spring 2004, pp. 107-126, vol. 18, No. 2., 2004, 107-126.
Yates, Alexander et al., "ShopSmart; Product Recommendations through Technical Specifications and User Reviews", ShopSmart: Product Recommendations through Technical Specifications and User Reviews; Alexander Yates et al. Temple University; CIKM; Oct. 26-30, 2008, Napa Valley, CA, USA; 2 pages.
Yen, Yi-Wyn, Yen, Yi-Wyn, Apple announces a 32GB iPhone 3G by Jun. 15, 2009, The Industry Standard, Apr. 2, 2009, http://www.thestandard.com/preditions/channel/hardware, downloaded Apr. 8, 2009.

* cited by examiner

MESSAGING SYSTEM AND SERVICE

CROSS-REFERENCE TO RELATED APPLICATIONS

This application is a continuation of U.S. patent application Ser. No. 12/477,766, filed Jun. 3, 2009 now abandoned, which is a continuation of U.S. patent application Ser. No. 12/002,452 filed Dec. 17, 2007, now U.S. Pat. No. 7,653,064, which is a divisional of U.S. patent application Ser. No. 10/555,543 filed Mar. 6, 2006, now U.S. Pat. No. 8,243,636 which is an application under 37 USC 371 of International Application PCT/GB2004/001953 filed May 6, 2004, which in turn claims the benefit of foreign priority of British Patent Application No, 0315984.5 filed Jul. 8, 2003, British Patent Application No, 0311592.0 filed May 20, 2003, and British Patent Application No, 0310366.0 filed May 6, 2003, the entire disclosure of each of which is incorporated herein by reference.

FIELD OF THE INVENTION

This invention relates to messaging systems, in particular but not exclusively to messaging carried out using wireless terminals, which operate in communications networks.

BACKGROUND OF THE INVENTION

Currently the Short Message Service (SMS) is the medium of choice for personal messaging, and several companies have designed systems that are intended to include advertisement information in SMS messages. For example, International patent application WO 03/015430 describes a service whereby advertisement data (including length of advertisement (number of characters), a preview of the advertisement and an identifier associated with the advertisement provided by external sources) are stored on mobile terminal in a "local" store, and the user selects an advert, from the store, to accompany an outgoing message. The terminal then calculates a length available for text, and the sender is allowed to enter a message having a length up to the calculated length. An outgoing message is then created, comprising the advertisement ID associated with the selected advertisement and the users message text, and having a header indicating that the message has advertising content. The outgoing message is then sent from the terminal and received by the SMSC, which checks the header of the message; any message having an identifier corresponding to the advertisement type is passed to an "ad server". The ad server processes the message, effectively selecting an advertisement from a store, creating one or more messages that comprise the selected advertisement and creating an SMS message that can be read by the recipient's mobile phone terminal.

Since advertisements are selected by the sender from those stored locally on terminal, the terminal needs to be equipped with appropriate software, and the currently selectable advertisement IDs need to be distributed to all subscribing terminals. In addition, the SMSC has to be equipped with some means of identifying these advertisement-type messages from other types of messages in order to route them to the ad server. Furthermore, since each SMS message is limited to 160 characters, the ad server quite often creates a plurality of messages, which means that either the receiving terminal has to be equipped with some software that concatenates the messages together in some elegant manner (since presentation is very important with advertising), or the receiving terminal simply displays the messages separately, as is the case with non-modified SMS messages exceeding 160 characters in length. Neither of these is ideal from the point of view of convenience or presentation.

The new messaging service, known as Multimedia Messaging Service (MMS), offers messages of unlimited size and content type that are compiled as HTTP messages, which means that they offer a transaction capability with possible super-distribution of content along with accuracy, tracking and feedback of messages. However, despite the fact that many mobile telephones have imaging and Multimedia Messaging Service (MMS) capabilities, and despite the fact that the Multimedia Message Service would appear to be a natural choice of messaging format for including advertising content, there is no guarantee that MMS will become as ubiquitous as SMS. This is due to several reasons, namely that there is a perceived high cost of Multimedia messaging; that SMS fulfils basic personal messaging needs; and that rich media messaging requires more imagination and preparation by the user.

An object of the present invention is to provide a convenient method of modifying messages, which, from the point of view of the end user, is simple to use.

SUMMARY OF THE INVENTION

According to a first aspect of the present invention there is provided a method of modifying a message sent through a data communications network, the message including transmission data identifying one or more destinations of said message and a message body identifying content thereof which is specified by a sending party, the method including:

selecting data, in response to receiving a said message, on the basis of at least one parameter that is not directly related to the location of the sending party, wherein the said selected data are not directly related to the content of the message;

modifying said message so as to include the selected data therein; and transmitting the modified message to said one or more destinations in accordance with the transmission data.

Embodiments of the invention thus provide a means of intercepting messages sent from A to B, modifying the message in a way that is unrelated to the content of the message, and transmitting the message onto its destination (B). Since the message is not modified by the terminal associated with the sending party, a party can take part in a message modification service according to the invention using a completely standard terminal.

In one arrangement, the message sent through the data communications network is an MMS message, and the modifying step includes adding selected data to the MMS message, and transmitting it as an MMS message; and in another arrangement the message originates from the sender as an SMS message, and the modifying step includes changing the SMS message into an MMS message, which includes both the content of the original SMS message and the data selected according to the method. In yet further arrangements, the message sent through the data communications network is an email message, and the modifying step includes adding the selected data to the email message and transmitting it as an email message; alternatively the message can be transmitted as GPRS data packets and the recipient is notified of the presence of a suitably modified message by means of an SMS message, whereupon the recipient can request delivery of the modified message in the form of GPRS data.

In order to participate in a service embodying this method, parties are required to subscribe to the service; subscription can be performed by entering data into a WAP page that is downloaded to the user's terminal or by entering data by means of a data gathering application running on the terminal. The subscribing step involves registering personal characteristics and statistics, and explicitly consenting to modification of their messages, The parameter used in the selecting step can be related to one or more of these personal characteristics, such as age, occupation, preferences, context (work, play) etc.; or related to environmental factors such as time of day, day of the week etc. Alternatively the parameter can be selected at random. Preferably the method includes keeping a track of data that have been selected, so as to ensure that the same data are not sent to the same person twice. The parameter may be a value indicating a number of modified messages that a recipient is willing to receive, in which case the method includes checking how many messages the recipient has already received and only modifying the message in the event that the specified number has not been exceeded.

The selectable data are preferably stored in a data store, such as a database, and, in order to enable personalized selection thereof, the selectable data are associated with data describing preferences, time of day, location, occupation, context etc. that characterize the selectable data and that correspond to the parameters. This therefore provides a means of selecting data that are suited to the sender and/or recipient.

The selecting step can include selecting data on the basis of a further parameter which may be related to the location of the sending and/or receiving party. Thus, for example, if the location of the sending party is identified to be in the vicinity of a football ground, the selection of data can include selecting data relating to football. Alternatively or additionally the further parameter can relate to the content of the message specified by the sending party. For example, the parameter could be words within the message; in some instances certain words can be linked with certain selectable data—for example, if the message includes the phrase "You should see my new shoes!", and the word "shoes" is linked to images indicative of a shoe retailer—then the selection of data can include data corresponding to one of these images.

Preferably the selectable data are categorised in some manner into a plurality of categories, and the sending and/or receiving party can specify a specific category of interest. Conveniently the categories can be previewed and selected either via the Web or via WAP-pages. This category selection provides a further means of personalizing the data that are selected for inclusion in the message. In one arrangement the categories are advertisement campaigns, which have a limited life span. When a campaign ends the subscribers who have selected that campaign (i.e. that category) can automatically be offered a new campaign of the same genre, e.g. via a MMS message containing new campaign details, terms and conditions.

Thus with embodiments of the present invention outgoing messages can be decorated with branded rich media content. This content can be tag-formatted advertising but could also be user generated or received from any $3^{rd}$ party, being appended to messages to as to provide sponsored terminal-to-terminal store-and-forward messaging.

The selected data can include one or more separate entities, for example, one entity can be an animation and another, an auto-play audio clip. The entities can be combined in a single message.

Since, in the first instance, the criterion used to select data to be used in message modification does not rely on input from the sending party when the message is composed, the mobile terminals do not require any additional software over and above the standard operating system software.

For the message sent through the data communications network to be routed to a service performing the method described above, the user does not need to explicitly enter details of the service (in terms of a network destination ID) on his terminal. Instead configuration messages can automatically be sent to the terminal when the user subscribes to the service. This feature of automatic modification of terminal settings forms a second aspect of the present invention.

In accordance with this second aspect of the invention there is provided a method of configuring a data message for transmission through a data communications network, wherein the data communications network comprises at least one store-and-forward network node arranged to store said data messages and forward the same to the or each recipient in dependence on status data corresponding to a terminal associated therewith, the method comprising:

receiving a configuration message identifying a store-and-forward network node;

selecting store-and-forward configuration settings from said configuration message;

creating a said data message, said data message comprising transmission data identifying one or more destinations of said message and a message body identifying content thereof; and transmitting said created data message in accordance with said selected store-and-forward configuration settings, wherein said configuration message identifies a store-and-forward network node to which a said data message is to be sent for modification of the content thereof during transmission of said message.

This configuration message can be sent to a subscribing mobile terminal via Over-The-Air (OTA) settings. The configuration message identifies a store-and-forward network node, which, when the terminal is sending MMS messages, corresponds to an MMSC other than the default network operator's MMSC, and is essentially a proxy MMSC. Subsequently created messages are thereafter sent to the identified store-and-forward network node, which is arranged to perform a method according to the first aspect of the invention. Having completed the method, the identified store-and-forward network node transmits the modified message to the conventional store-and-forward server (MMSC), which is typically owned by the network operator.

Since the method is performed on a bespoke store-and-forward network node, a further advantage of embodiments of the invention is that it does not interfere with existing services, which means that subscribers can still receive MMS messages from the default (network operator's) MMSC.

The personal details entered by subscribers are conveniently stored in a database that is independent of network operator, which facilitates providing initial distribution statistics and tracking eventual super-distribution of multimedia content across various network operators.

In addition to providing a system for modifying personal messages emanating from individual subscribers, the invention can be applied to modify messages emanating from information providers and the like. Accordingly, in a third aspect of the present invention there is provided a method of modifying a message sent through a data communications network, the method comprising:

receiving, at a second network node, a message from a first network node, the message having a message body comprising first data, and transmission data identifying a destination of said message, wherein the first data have been created by an information service;

selecting second data, in response to receiving said message;

modifying said message so as to include the selected second data in the message body thereof; and transmitting the modified message to said destination in accordance with the transmission data.

Further features and advantages of the invention will become apparent from the following description of preferred embodiments of the invention, given by way of example only, which is made with reference to the accompanying drawings.

DETAILED DESCRIPTION OF DRAWINGS

Embodiments of the invention are concerned with modification of data messages en route for a recipient. Specifically, embodiments are concerned with performing a modification that is independent of the subject matter of the data messages, instead basing the modification on some parameter that is extrinsic to the content of the message. The nature of this modification, and the criteria used to make the modification, will be described in detail later in the description, but first a description of the infrastructure needed to support the modification will be presented.

Figure 1:
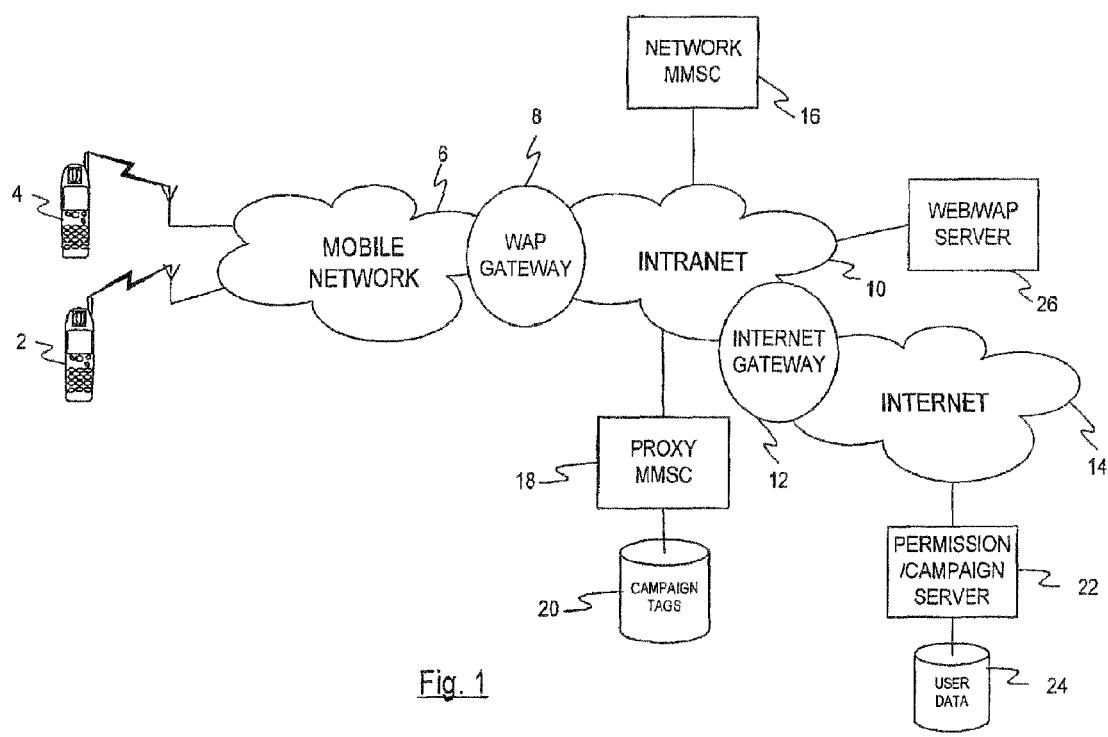
FIG. 1 is a schematic illustration of a mobile network arranged in accordance with an embodiment of the invention.
Figure 2:
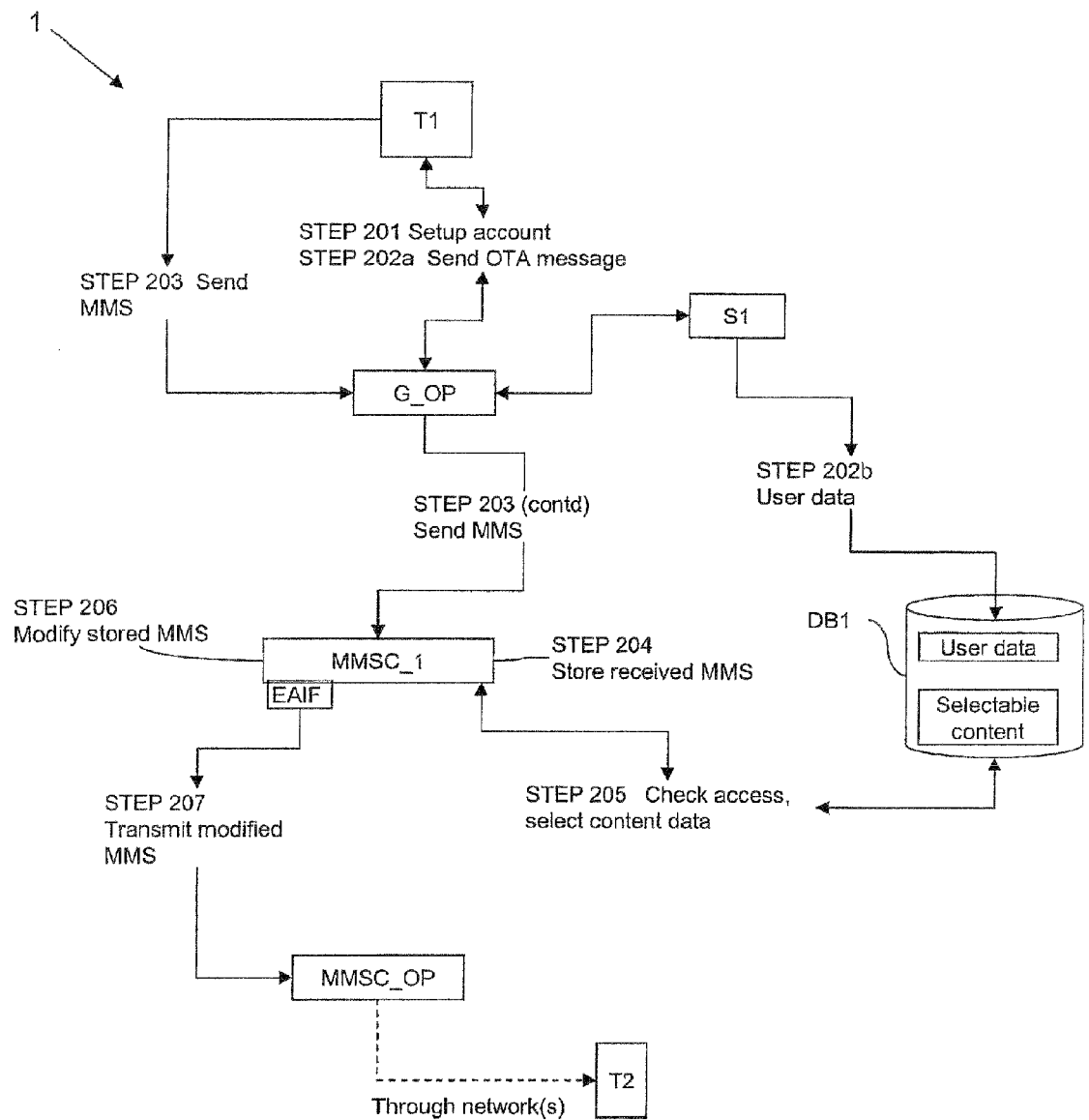
FIG. 2 is a schematic illustration of data exchanges between components of the system illustrated in FIG. 1.

FIGS. 1 and 2 show an example of a data messaging system 1 within which embodiments of a first aspect of the invention operate. In FIG. 2, the arrows indicate data flows within the data messaging system 1 and the blocks indicate components of the data messaging system 1. This embodiment, hereinafter referred to as a message modification service, is concerned with Multimedia messages (MMS messages), but the messages could be short messages (SMS), email messages, bespoke messages in the form of GPRS data and/or streamed data; the specific arrangement of the data messaging system 1 is dependent on the type of message being transmitted, and alternative configurations are described later.

In the arrangement shown in FIGS. 1 and 2, a terminal T1 communicates with various network devices within the data messaging system 1. The terminal T1 may be a wireless terminal such as a mobile phone, a PDA or a Laptop computer. The data messaging system 1 comprises a WAP gateway G_OP, which is typically a network operator's WAP gateway; a Web and WAP services server S1, with which the terminal T1 communicates; first and second store-and-forward message servers MMSC_1, MMSC_OP, the second being a network operator's store-and-forward message server configured to store and forward messages in accordance with conventional methods; and a database DB1, arranged to store data in respect of subscribers, terminals such as T1 and content data.

In one arrangement the first message server MMSC_1, together with the Web and WAP services server S1, is arranged to operate inside the network operator's network, whilst the database DB1 is located within a proprietary network, which means that it is independent of any specific network operator and can be shared across a plurality of network operators. The database DB1 can either be provided by two separate databases 20, 24, as shown in FIG. 1, or by a single database, as shown in FIG. 2.

Figure 3:
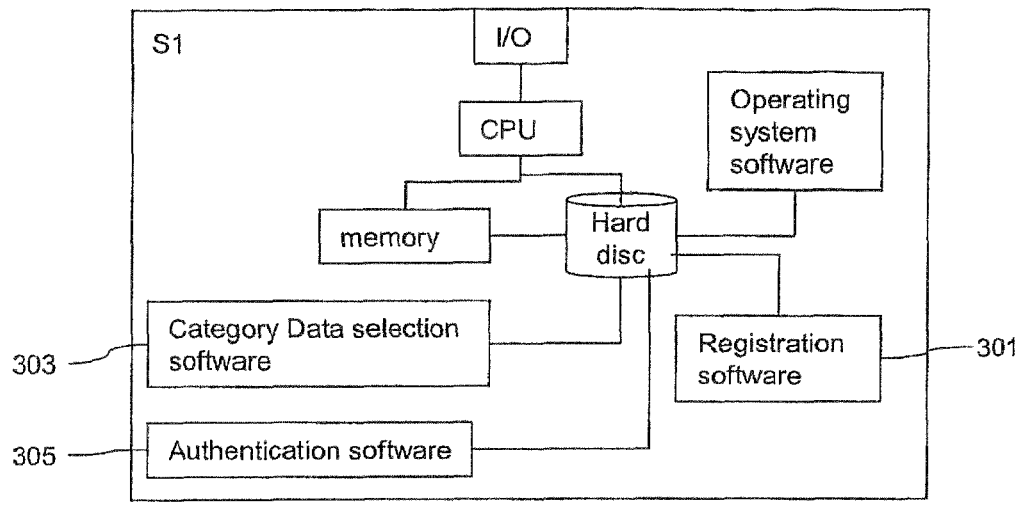
FIG. 3 is a block diagram showing components of the Web and WAP services server shown in FIGS. 1 and 2.

Referring to FIG. 2, the Web and WAP services server S1 can be accessed by a user of the terminal T1 actuating a URL corresponding to the server S1. Referring to FIG. 3, in addition to standard CPU, memory, data bus, Input/Output ports, data storage, and operating system programs, the server S1 comprises registration software 301, which processes requests to subscribe to the message modification service, while additionally receiving identification and preference data in relation to the subscriber; category selection software 303, which processes incoming category selection requests; and authentication software 305, which authenticates incoming requests for access to the category selection software. The data selection, identification and preference data are subsequently stored in the database DB1 for subsequent access by the first message server MMSC_1. The server S1 can either be provided by two separate servers 22, 26 (with the registration software 301 on server 26 and the authentication and category selection software 303, 305 on server 22) as shown in FIG. 1, or by a single server, as shown in FIG. 2.

Figure 4:
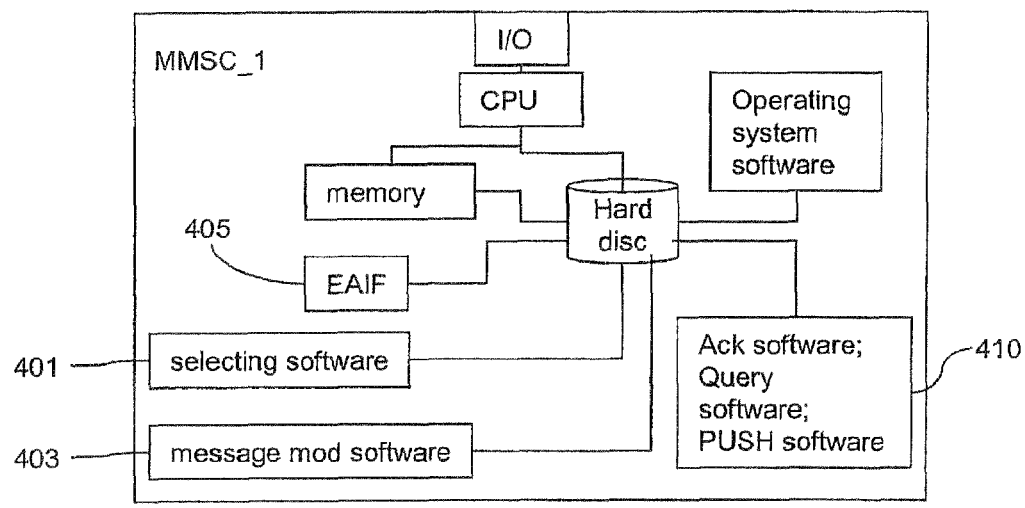
FIG. 4 is a schematic block diagram showing components of the proxy message server MMSC shown in FIGS. 1 and 2.

The first message server MMSC_1 can be considered a "proxy" store-and-forward message server, which is located between the network operator's WAP gateway G_OP and the network operator's message server MMSC_OP. Referring to FIG. 4, the MMSC_1 comprises standard processing components, and includes conventional software or hardware means for: notifying, in response to receipt of an MMS, the sending party that it has accepted the MMS; interrogating subscriber databases to determine whether the intended recipient has an MMS-compatible phone; informing the intended recipient that an MMS is available; and, in response to a request from the recipient, sending the message thereto (shown in combination in box labeled 410). In addition to these standard components, the MMSC_1 includes selecting software 401 for selecting data to add to an incoming message (described in more detail below), message modifying software 403 for modifying the incoming message so as to include the selected data (described in more detail below); and an external application interface (EAIF) 405 that is configured to enable the message server MMSC_1 to communicate with the operator's message server MMSC_OP, specifically to forward the modified messages to the operator's MMSC_OP in accordance with standard methods.

The selecting software 401 is arranged to identify sender and/or recipient information from an incoming message and select, by accessing the database DB1, the sender and/or recipients' permission and preference settings in order to determine how to modify the incoming message. The modifying software 403 is arranged to modify the incoming message in accordance with input from the selecting software 401, sending the modified message to the recipient in one of a plurality of formats (e.g. SMS or MMS). Preferably the proxy (or first) message server MMSC_1 communicates with the database DB1 via a Internet virtual private network (VPN) connection, and is arranged to cache, e.g. in an SQL database, permission and preference information so that it can operate the service even in case of VPN outages.

The registration software 301, category selection software 303, authentication software 305, selecting software 401 and modifying software 403 are preferably written in the Java programming language. The server S1 could, for example, be an Apache HTTP server, and the proxy message server MMSC_1 could be a J2EE JMS Server (see http://openjms.sourceforge.net/). The registration software 301, category selection software 303 and authentication software 305 could be Java™ servlet containers configured to run within a Java platform such as Java 2 Platform Standard Edition v1.4.1 (for further information see resources available from Sun Microsystems™ e.g. at http://java.sun.com/j2se/1.4.1/and http://java.sun.com/products/servlet/index.html). The skilled person will appreciate that the software could be written in any suitable language.

Referring back to FIG. 2, one way of setting up an account with and making use of, the message modification service according to this embodiment will now be described. At step 201 the user enters the URL corresponding to the Web and WAP services server S1, which causes the registration software 301 to send a Web page from the server S1, via the WAP gateway G_OP, where it is modified, using conventional techniques, into a format suitable for display on the user's terminal T1, and sent to the terminal T1. The user then enters various registration details into the web page and the terminal T1 sends the details to the server S1, via the WAP gateway G_OP. Referring back to FIG. 2, as part of the registration process, the user enters personal information details, such as name, address, terminal details (including capabilities), sex, occupation, interests, etc. and these details are stored, at step 202b, in the database D131. Also a part of the registration process, the registration software 301 sends the user a user ID and password for accessing the server S1.

Alternatively the terminal T1 could have, stored thereon, an application arranged to capture such demographic data (not shown in the Figures) and which encapsulates the captured data in SMS messages or as GPRS packets and then transmits the same to the server S1. A suitable application could be transmitted to the terminal T1 (e.g. via GPRS or Bluetooth) in response to a request received by the server S1 from the terminal T1 and would be of a format suitable for cooperating with the operating system in use on the terminal T1 (alternatively the application could be pre-loaded onto the terminal T1).

Having completed the registration process, the registration software 301 sends, at step 202a, data via an Over-The-Air (OTA) MMS settings message, to the terminal T1, with details of the proxy message server MMSC_1. In response to receiving this message, the operating system programs on the terminal T1 automatically configure the default MMSC settings including the network address (URL) of the proxy message server MMSC_1 in accordance with the settings in the message. This therefore means that any MMS messages subsequently sent from the terminal T1 will be sent to the proxy message server MMSC_1 in the first instance. For further information regarding use of OTA protocol for the delivery of data to a WAP client from a WAP server, the reader is referred to literature available from the WAP Forum Ltd., in particular "Wireless Application Protocol, PUSH OTA Protocol Specification", published 16 Aug. 1999, available from http://www.wapforum.org/what/technical/PROP-PushOTA-19990816.pdf.

In addition to storing and processing registration requests, the server S1 is arranged to display, on request, a plurality of selectable categories, from which the subscriber can select. The subscriber can attempt to access the server S1 at any time, causing the authentication software 305 to authenticate or otherwise the access request. Several authentication methods are possible, one being based on the user's mobile phone number or the terminal ID (this being identifiable from, e.g. the header of a message associated with the access request), and another being via a web page having data entry fields corresponding to user name and password. Once authenticated, the user can select a category from the plurality, causing the selected category to be stored in the database DB1, along with other data associated with this user. The categories represent subject areas of interest—e.g. types of music, football, types of drinks etc. These selected category data, along with the user data stored at step 202b, are then available for use by the selecting software 401 running on the proxy message server MMSC_1, as will be described in more detail below. Alternatively, and in the event that the terminal T1 has a suitable local application stored thereon, the category data could be sent from the terminal. T1 to the server S1; in such an arrangement the category data from which selection is to be made could be made available to the terminal T1 by means of the server S1 sending category data to the terminal T1 via SMS messages or as GPRS packets.

The aspect of category selection is not essential to the invention, but is a preferred feature, since it enables the proxy message server MMSC_1 to select content that matches some aspect of the sender's interests. Further aspects of this category selection are described in more detail below.

Figure 5:
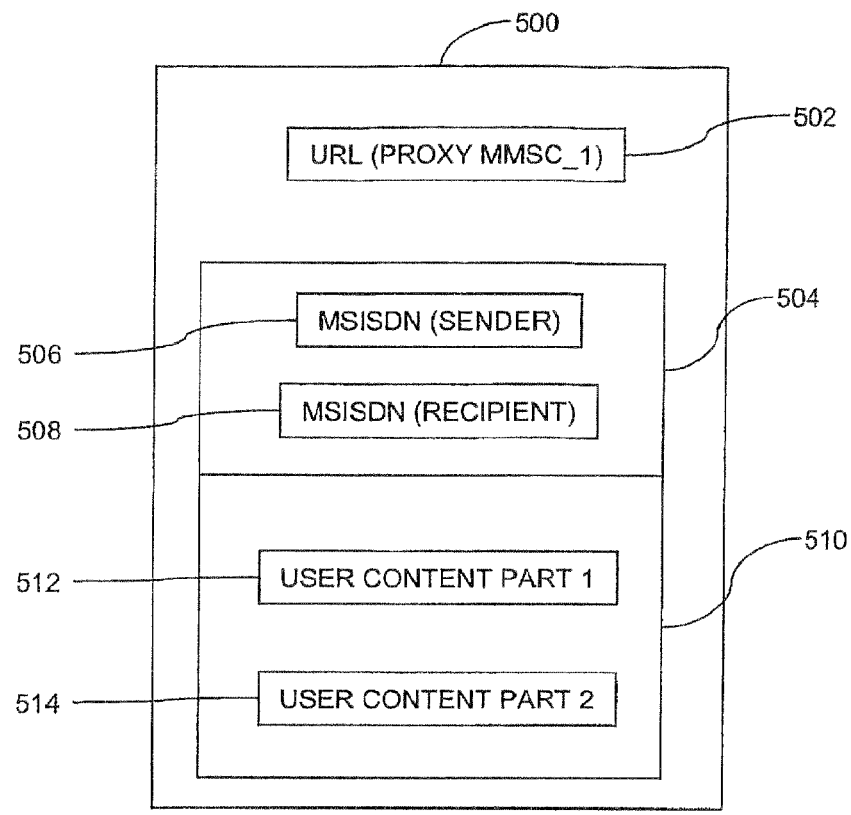
FIG. 5 is a schematic diagram illustrating an MMS message when transmitted from a sender terminal to the proxy message server MMSC shown in FIG. 2.
Figure 7:
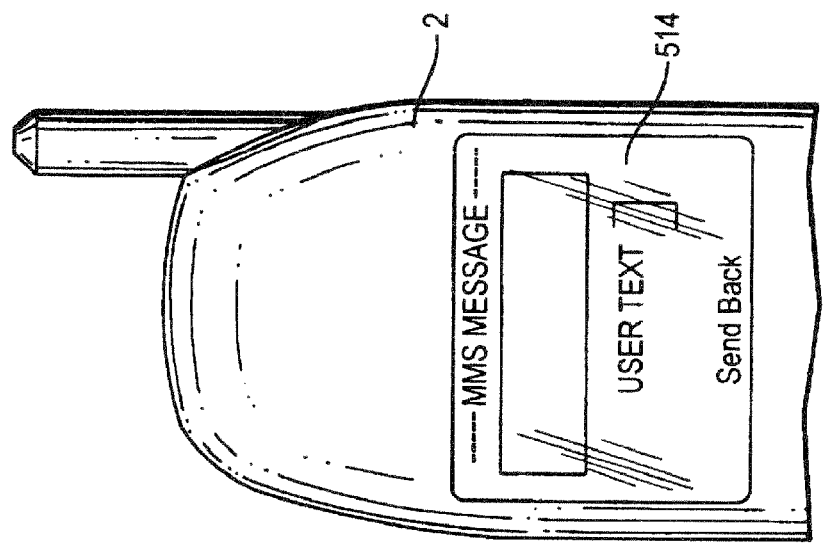
FIGS. 6 and 7 show user content parts of the MMS message of FIG. 5 when transmitted from a sender terminal.
Figure 6:
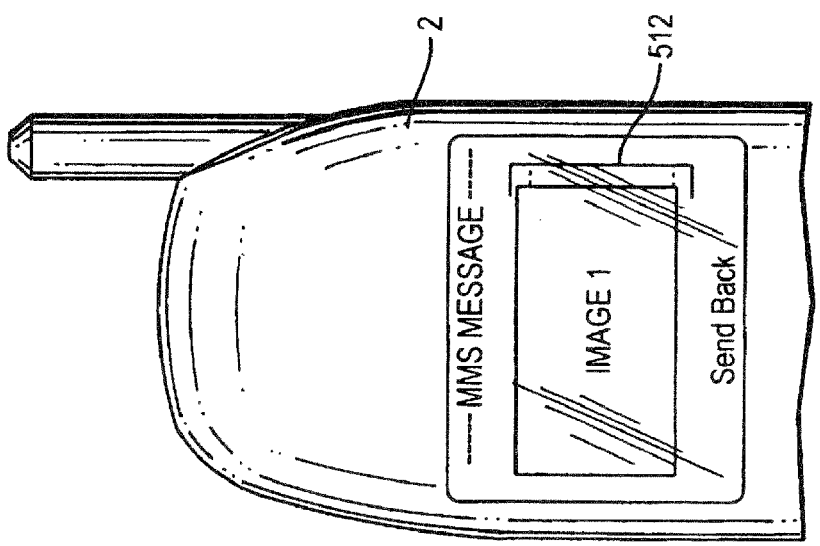

Having registered with the service and modified the store-and-forward multimedia message server settings on the terminal T1, any subsequently sent MMS messages by the terminal T1 will be directed to the proxy message server MMSC_1 and modified thereby, as will now be described with reference to FIGS. 5-7. At step 203, a MMS message is sent by the terminal T1; this message is encapsulated in an HTTP POST message including HTTP header 502 which identifies with the appropriate URL that the proxy message server MMSC_1 is the HTTP message recipient. The HTTP message body includes MMS header portion 504 and MMS body portion 510. The MMS body portion 510 includes one or more user content parts 512, 514, such as those illustrated in FIGS. 6 and 7.

Figure 8:
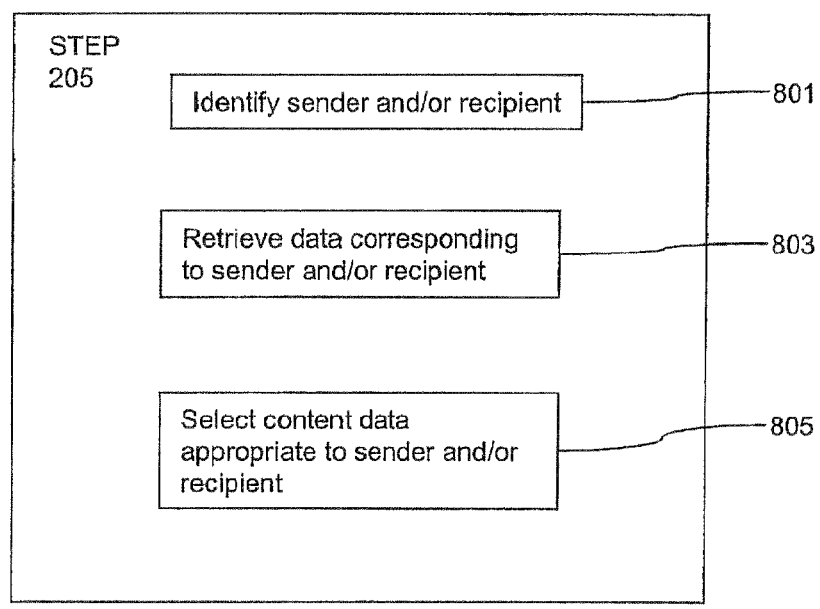
FIG. 8 is a flow diagram showing sub-steps of the data exchanges shown in FIG. 2.

At step 204, the MMS message 500 is received and stored by the proxy message server MMSC_1, in accordance with conventional techniques and at step 205, the selecting software 401 selects content data from the database DB1. Referring to FIG. 8, this step involves performing a plurality of sub-steps: firstly identifying (sub-step 801) the sender and recipient of the message (parts 506, 508); secondly retrieving (sub-step 803) user data from the database DB1 corresponding to the sender and/or recipient; and thirdly applying (sub-step 805) a filtering algorithm to the content data stored in the database DB1, using the user data retrieved at sub-step 803, in order to select content data appropriate to the received MMS. The nature of this filtering algorithm is described in more detail below.

Figure 9:
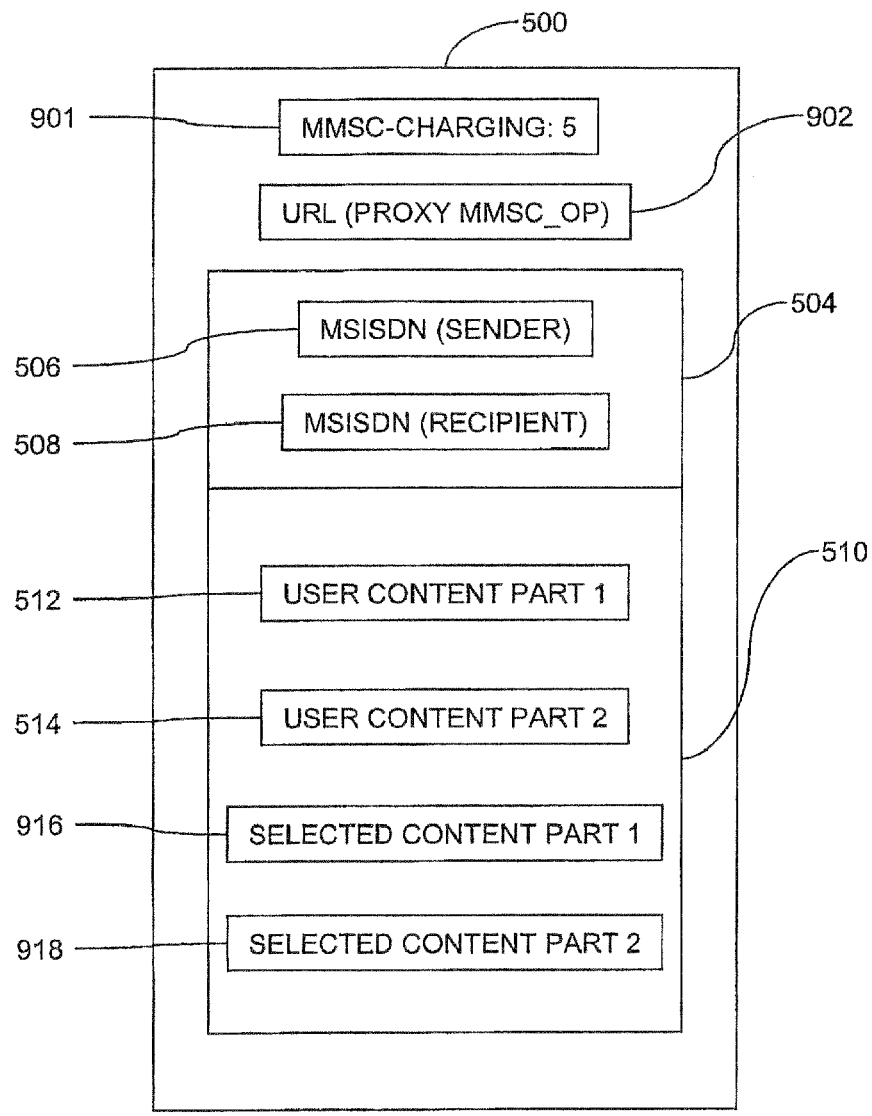
FIG. 9 shows content parts of an MMS message when modified according to an embodiment of the invention.

Once the content data have been selected, the message modification software 403 modifies, at step 206, the MMS that was stored at step 204. An MMS so-modified is shown in FIG. 9: the MMS is encapsulated in an HTTP POST message 900 including HTTP header 902 which identifies the network operator's message server MMSC_OP as the HTTP message recipient; the HTTP message body includes MMS header portion 504 and MMS body portion 510. The MMS message body portion 510 includes, in addition to one or more user content parts 512, 514, one or more content parts 916, 918. The HTTP message can also include an extension HTTP header 901, which includes charging information. At step 207 the modified MMS is transmitted to the network operator's message server MMSC_OP, and thereafter is delivered to the recipient (T2) in accordance with conventional methods.

As stated above, embodiments of the invention are concerned with modification of data messages en route for a recipient. The use of OTA messages to modify settings on a terminal, for use in re-directing messages whose content is to be modified without direct input from the sender is new. Thus the data messaging system 1, the proxy message server MMSC_1 and the functionality provided by the Web and WAP server S1 described above are new. Since the nature of this modification is not directly dependent on any input from the sender of the message, neither the sender nor recipient is required to modify their terminal. Furthermore, and as stated above, the idea of using OTA settings to direct messages to devices associated with the service means that the terminals do not need to be modified in this respect either. This therefore means that the service can be used independent of terminal type, which is a significant advantage.

The aspects of data selection—step 205 (and sub-steps 801, 803, 805)—will now be described in more detail.

As described above, once a user has subscribed to the message modification service, he can subsequently access the server S1 to specify a category of interest, which is then used by the proxy message server MMSC_1 in selection of data when modifying an incoming message. In one embodiment the data to be included in the messages (sub-step 805) is branded rich media content, in which case the categories from which the subscriber can select corresponds to a brand and the content is advertising content, referred to herein as a Tag element.

Figure 10A:
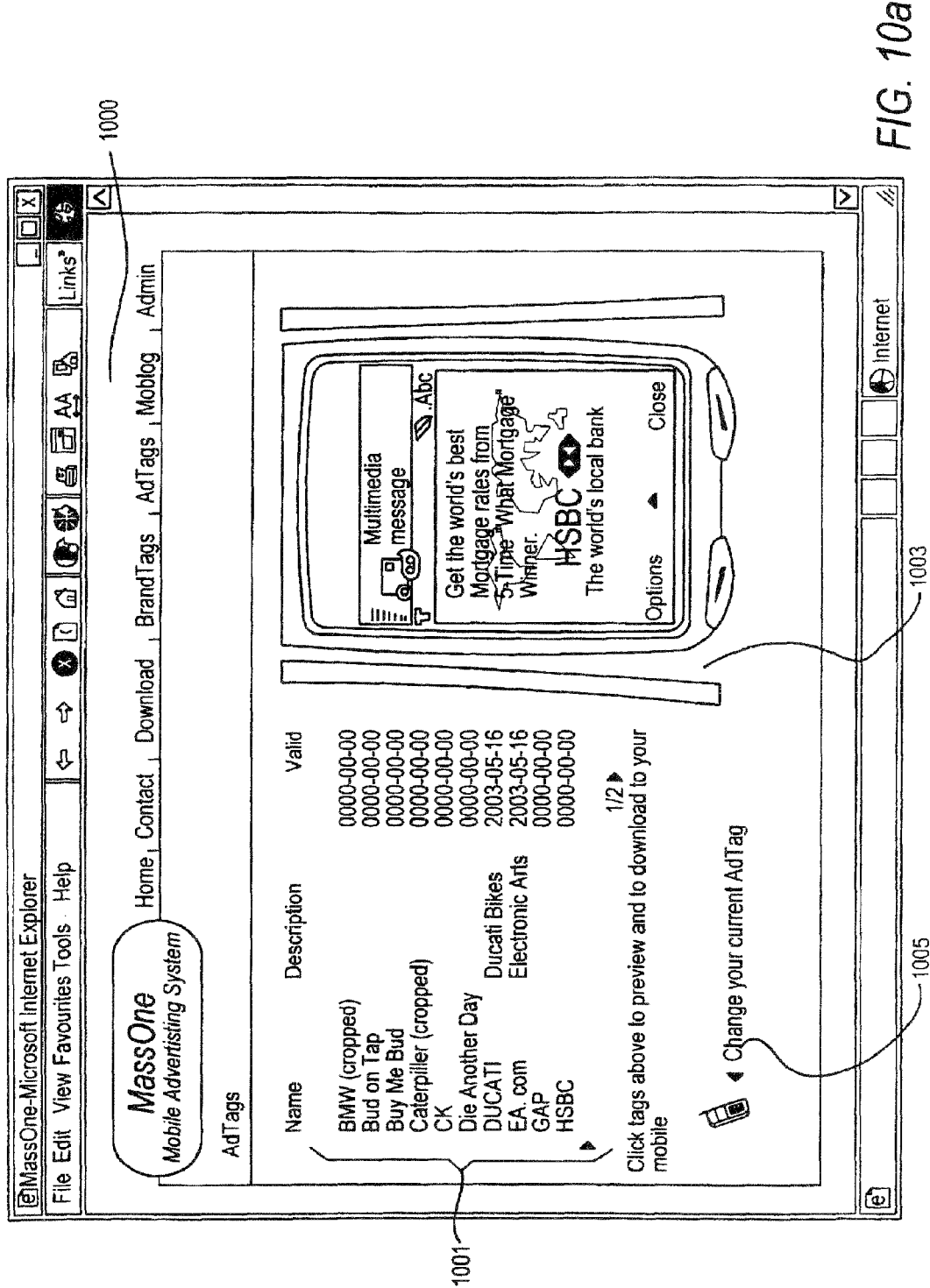
FIG. 10a shows a Web page allowing a subscriber to select a category of interest.
Figure 10B:
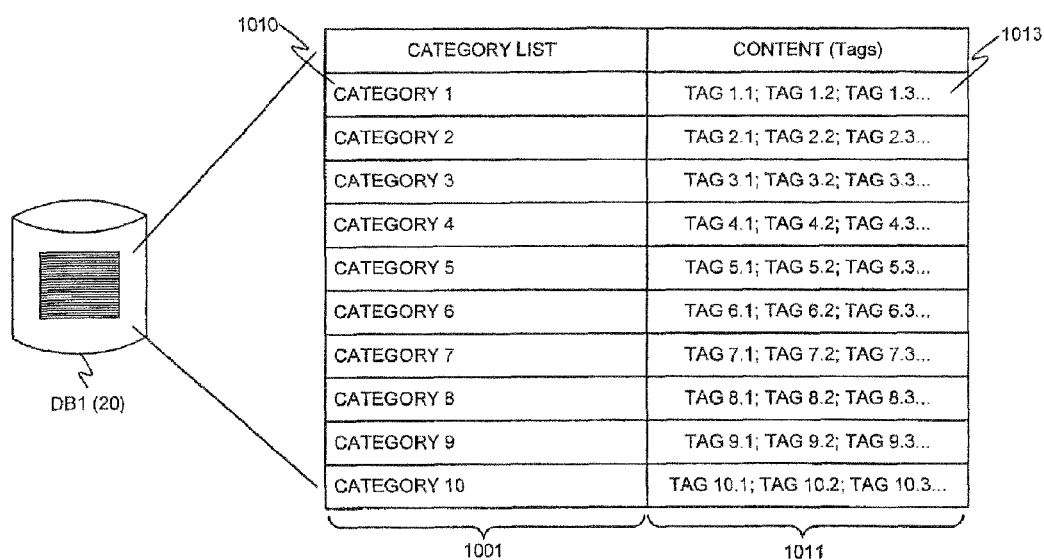
FIG. 10b is a schematic illustration of category information and data corresponding thereto, as stored in the database shown in FIGS. 1 and 2.

FIG. 10a shows a Web page 1000 allowing a participating message sender to select a category 1001, and an example of a tag 1003 within one of the categories; modification of a currently selected category can be made via item 1005 on the Web page 1000, FIG. 10b shows category information 1001 and content (Tags) 1011 corresponding thereto, and shows that each category 1010 has a plurality of Tags 1013 associated therewith, Once a category has been selected by the sender, and when an MMS message is subsequently sent by the corresponding sender (step 203) the selecting software 401 running on the proxy message server MMSC_1 selects (sub-step 805) one or more of the Tags in the selected category to be added to the message being sent.

There are several advantages associated with this category feature of the invention, a first of which is that it provides a means of ensuring that content that is selected by the selecting software 403 is relevant to the sender's and/or recipient's interests, thereby removing the need for the sender to include this information in the messages to be modified. A second advantage is associated with the fact that the categories are stored and maintained in a central location. In the event of a change of category (which is common in the field of advertising), the change only needs to be effected at a central location, rather than having to distribute data identifying the updated categories to each subscriber to the message modification service.

As described above, at sub-step 805, the selecting software 401 applies a filtering algorithm to select an appropriate Tag to add to the message. Functionally, the filtering algorithm ensures that different Tags, each in the same user-selected category, are added to subsequent messages transmitted using the system, and generally that various of the different Tags available in a category are added to different messages. More specifically the filtering algorithm employs one or more of several parameters to select, from all of the Tags available in a category, the Tag or Tags to be added to the current message. As stated above, the selection of Tag is not directly related to input from the sender of the message, meaning that these parameters are essentially unrelated to the content of the MMS message (the content being parts 512, 514 shown in FIG. 5).

Instead, these parameters include one or more of:
1. The sender identity (either sending terminal T1 or information service (see below)), as identified in the MMS message header 504 (part 506), and data associated with the sender identity, such as:
    a. data identifying a stage in the category the sender is, as determined by the number and/or type of Tags previously sent by the sender;
    b. data identifying sender characteristics, such as age, sex, etc.;
    c. current context of the sender (i.e. home or at work);
    d. whether the sender has explicitly opted out of a particular category
2. The recipient identity, as identified in the MMS message header 504 (part 508) and data associated with the recipient identity, such as:
    a. data identifying a stage in the category the recipient is, as determined by the number and/or type of campaign messages previously received by the recipient;
    b. data identifying recipient characteristics, such as age, sex, etc.;
    c. current context of the recipient (home or at work);
    d. whether the recipient has explicitly opted out of a particular category;
3. A combination of sender and recipient identities (as per 1. and 2. above);
4. The current time and/or date;
5. Scheduling data for Tags;
6. Data relating to events occurring at that date or time (so that the selecting software 401 is arranged to access various electronically available entertainment listings, such as TV, films etc.);
7. A random selection parameter, causing the selection to vary between messages.

In order to select Tags on the basis of on one or more of these parameters, each of the Tag is characterized in some manner, and indeed, such characteristics data are stored in DB1 together with data identifying the Tags themselves.

Selection can also be based on the content of the MMS message itself (parts 512, 514). For example, Tags may be linked to certain words, or phrases, that appear in the message 500—e.g. if the user content part 512 includes the word "beer" (so that the message could be, for example, "Hi Steve, meet me at the Crown for a beer or six!"), one of the Tags linked to the word "beer" could be selected by the selecting software 401 at sub-step 805. Additionally or alternatively selection can be based on the location of the sender and/or recipient. For example, if the sender is identified to be at a cricket match, then, assuming there to be a mapping between cricket and Tags, one of the Tags linked to a cricket location could be selected at sub-step 805.

If the selecting software 401 determines, at sub-step 801, there to be multiple recipients, the selecting software 401 may either select a different Tag for each recipient or may select one that best matches the characteristics of all of the recipients. The latter may be achieved by evaluating characteristics of Tags against characteristics of each recipient, quantifying the evaluation into a score for each Tag and selecting whichever Tag has the highest score. In the event that the recipients and sender have previously selected categories that are different with respect to one another, the selecting software 401 can either only select Tags within the category corresponding to the sender, or identify the category most common to all recipients and sender and select Tags within that identified category.

The categories displayed on the Web page 1000 for selection therefrom can be dependent on characteristics of the subscriber. For example, when subscribing to the message modification service (step 201) the registration software 301 may ask the subscriber for his home, or preferred, location. As described above, these data are stored in database DB1 as user data at step 202b, so that, when a subscriber subsequently logs in to select a category, the category selection software 303 can display only those categories that match the subscriber's location. Other parameters can be used when determining which categories to display.

Whilst in the above embodiment settings corresponding to the proxy message server MMSC_1 are sent via an OTA message, they could alternatively be embedded in the terminal's SIM card, so that the subscriber receives and changes SIM when he has subscribed to the service. As a further alternative, the user could be notified of the settings and manually change them.

As an alternative to the proxy message server MMSC_1 implementation, the present invention could be installed as a filtering application (not shown) on the operator's message sewer MMSC_OP. In the event that the processing load associated with the selecting and modification of messages becomes significant, the data messaging system 1 could also include a separate, secondary MMS message server (not shown), which is configured with the selecting software 401, message modification software 403 and the EAIF 405. In such an arrangement the filtering application running on the operator's message server MMSC_OP could be arranged to pass messages that are identified to have been received from a subscriber to the service to this secondary MMS message server. In either of these arrangements the step of sending an OTA message to re-set MMSC settings in the subscriber's terminal would not be necessary.

As stated above, the arrangement shown in FIGS. 1 and 2, and the foregoing description is specifically tailored to the sending of MMS messages. However, the idea of modifying a message without requiring direct input from the sender, instead basing the modification on some parameter that is extrinsic to the content of the message, can be applied to other message types, such as SMS, all and streamed data (e.g. multicast data). The arrangement of the data messaging system 1 can be expected to vary, depending on the type of message to be sent, and FIGS. 11-14, together with the following description, briefly outlines alternative arrangements of the data messaging system. In these figures, where the functionality is identical or equivalent to that described with reference to FIG. 2, identical reference numerals are used; if there is additional, or substantial differences in functionality, different reference numerals are used.

Figure 11:
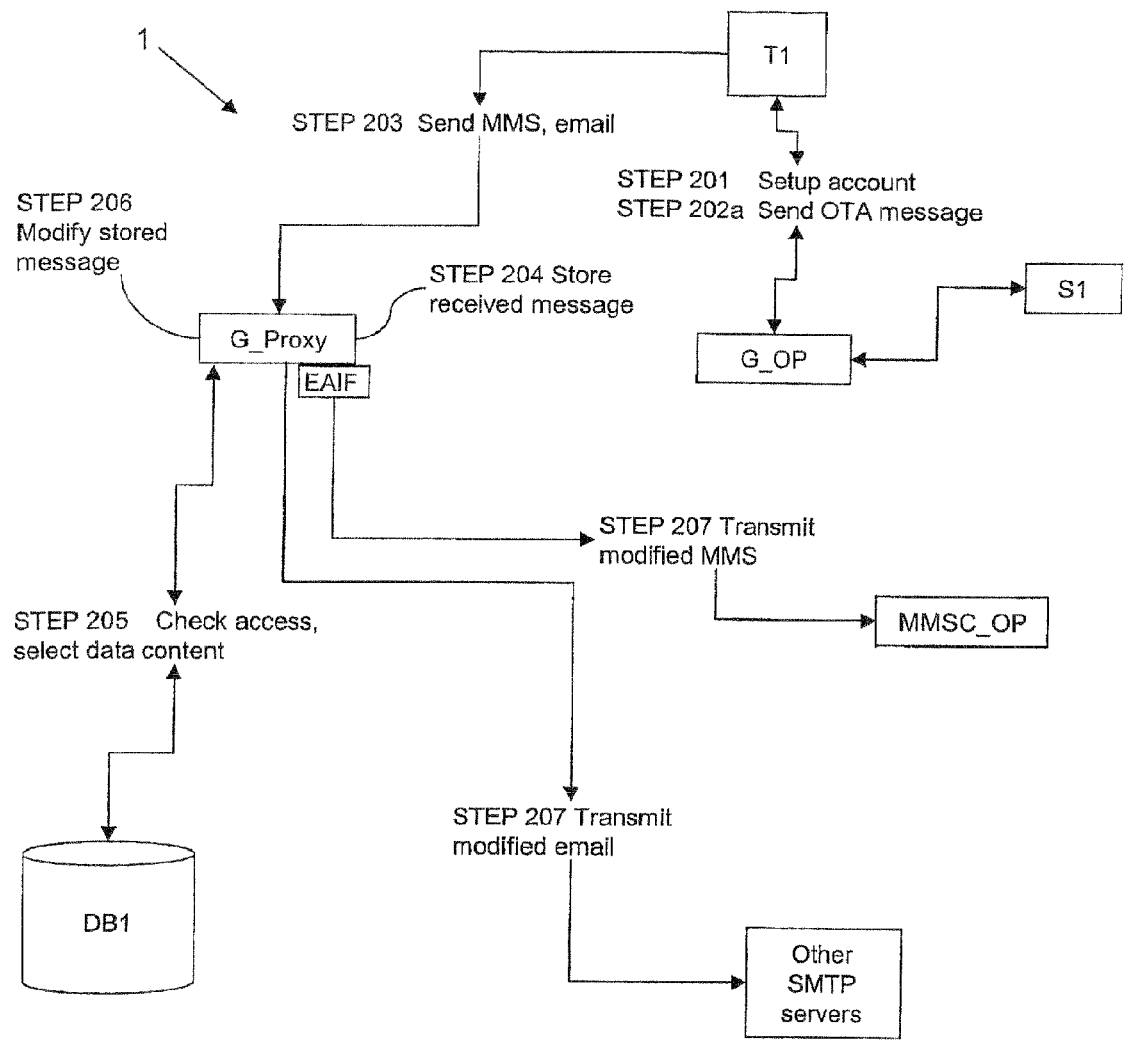
FIG. 11 is a schematic illustration of an alternative configuration of components of a mobile network according to a second embodiment of the present invention.

The data messaging system 1 shown in FIG. 11 is suitable for sending MMS messages or email messages. In this arrangement, the settings sent at step 202a correspond to a proxy WAP gateway G_Proxy, which has conventional WAP gateway functionality plus an SMTP server combined with the store-and-forward software 410, selecting software 401, message modification software 403 and the EAIF 405. The store-and-forward software 410 essentially includes components that are configured to store and transfer emails accordance with the SMTP protocol and components configured in accordance with MMS message handling (described above) (for information specifically related to SMTP issues, the reader is referred to Request For Comments (RFC) 2821, available from the IEEE at http://www.rfc-editor.org/).

Figure 12:
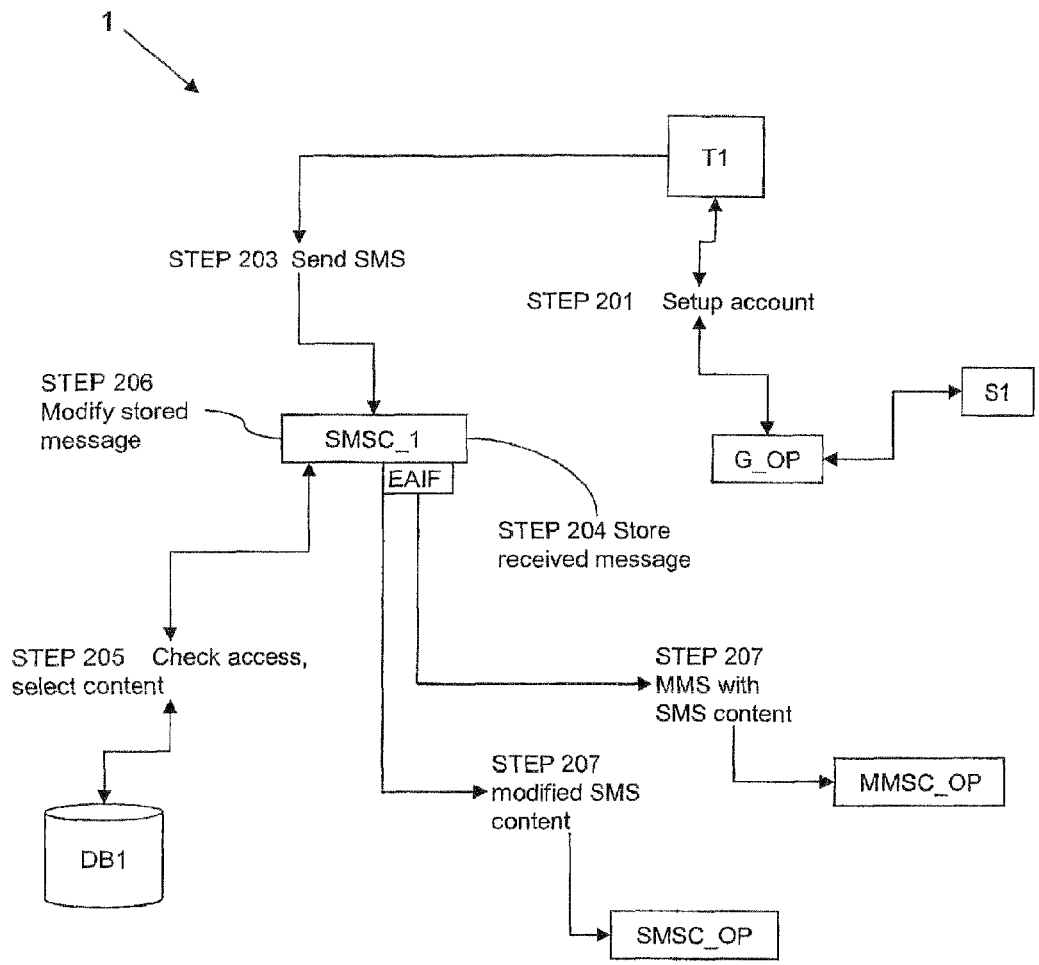
FIG. 12 is a schematic illustration of an alternative configuration of components of a mobile network according to a third embodiment of the present invention.

The data messaging system 1 shown in FIG. 12 is suitable for a subscriber sending SMS messages. In this arrangement the settings on the terminal T1 corresponding to the SMSC have been modified in some manner, so that outgoing SMS messages are directed to the proxy short message server SMSC_1. The message modification software 403 is arranged to either embed the content of the received message (parts 512, 514) into an MMS message (which then includes selected parts 916, 918), thereby effectively changing an incoming SMS message into an outgoing MMS message, or, if the terminal corresponding to the recipient is not MMS-enabled, to modify the received SMS message so that it includes selected parts 916, 918 (or ASCII character versions thereof), and forward the modified message as an SMS message.

Figure 13:
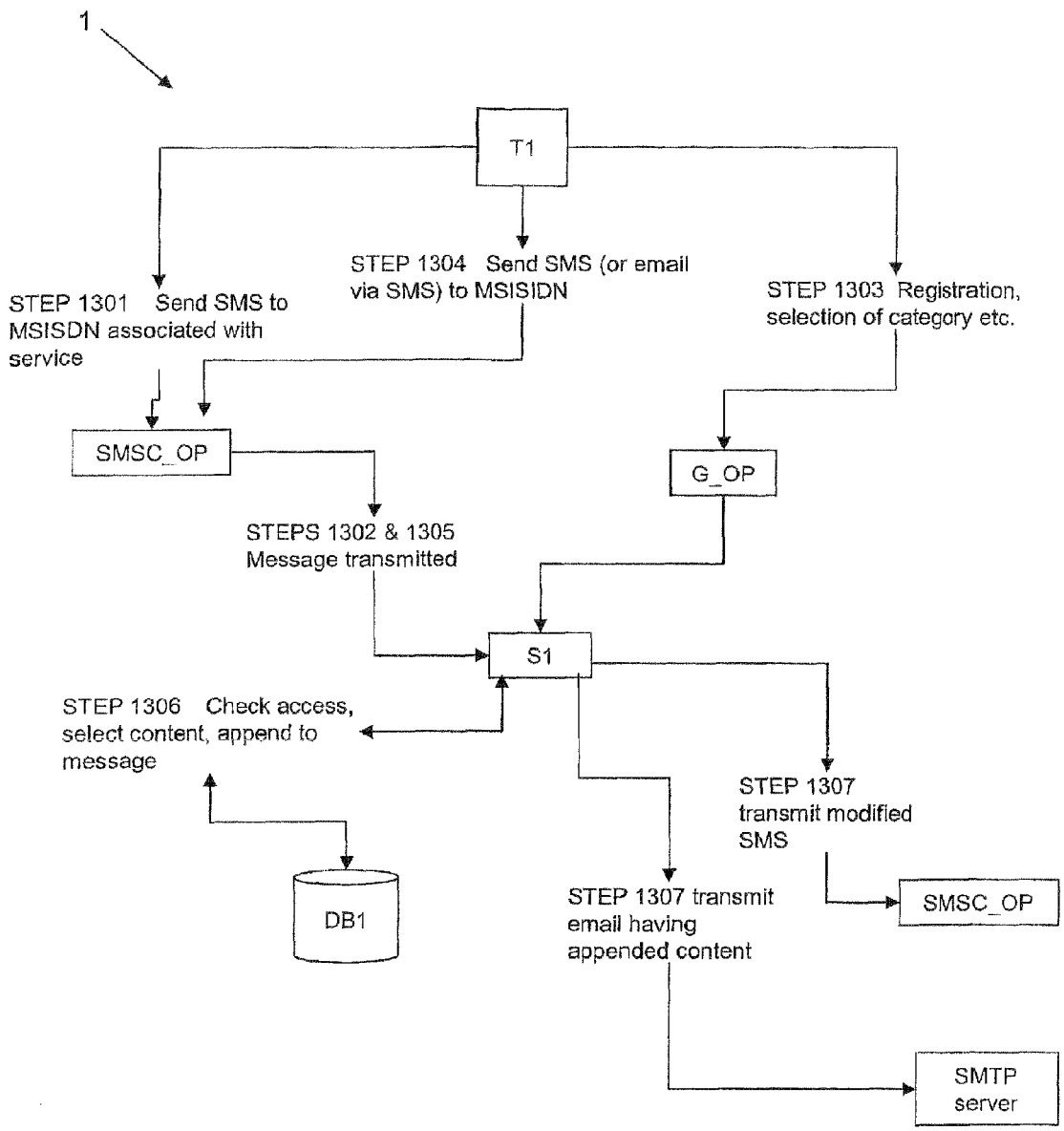
FIG. 13 is a schematic illustration of an alternative configuration of components of a mobile network according to a fourth embodiment of the present invention.

FIG. 13 shows a yet further arrangement of the data messaging service 1 that is suitable for sending SMS or email messages that have emanated as SMS messages. In this arrangement, registering with the message modification service involves firstly sending an SMS to a number associated with the service (steps 1301, 1302), then logging into a web page associated with the service in order to enter the various user details required by the service (step 1303). In this arrangement the selecting software 401 and message modification software 403 are stored on, and processed by, the WAP and Web services server S1, which thus additionally acts as a store-and-forward server.

Figure 14:
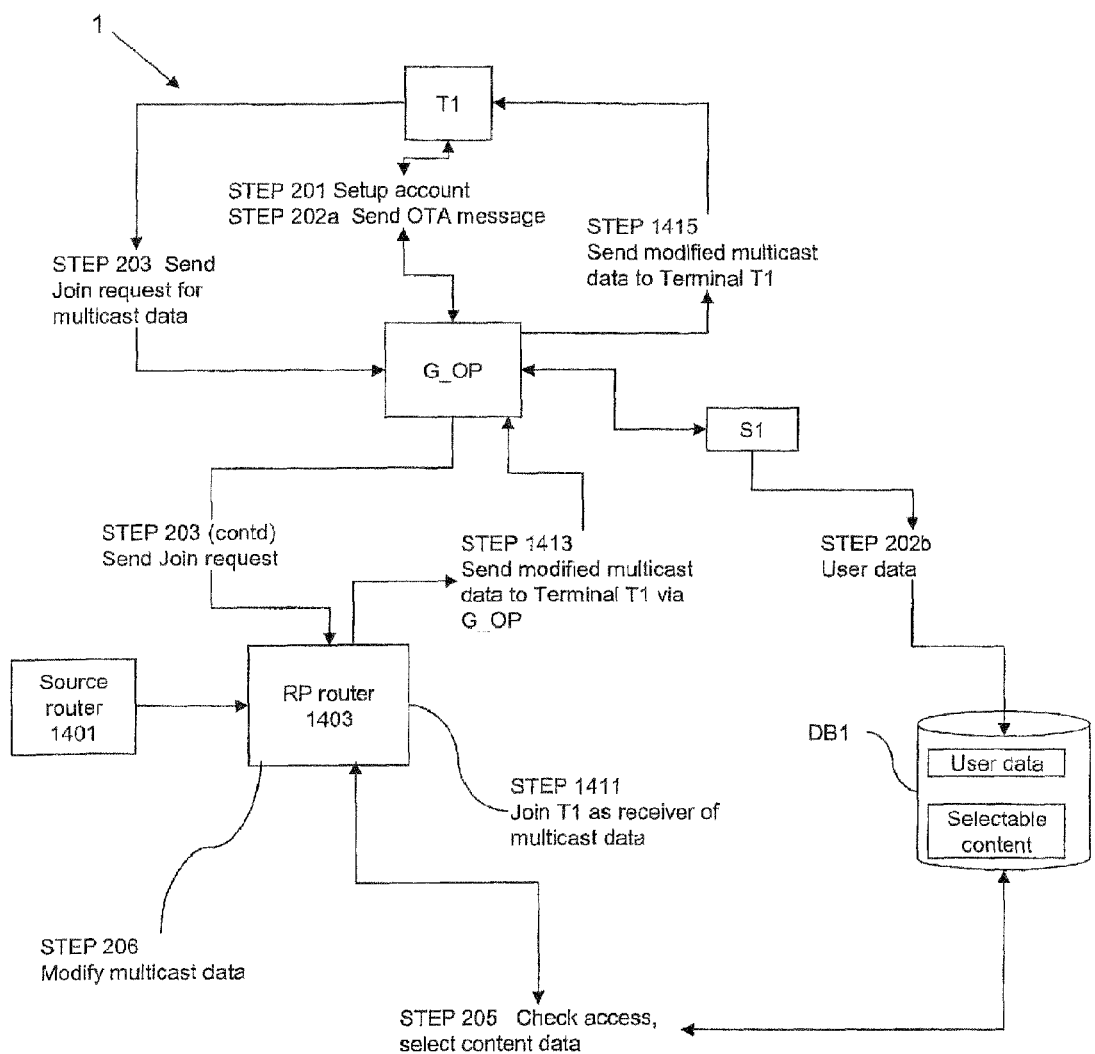
FIG. 14 is a schematic illustration of an alternative configuration of components of a mobile network according to a fifth embodiment of the present invention.

FIG. 14 shows a yet further arrangement of the data messaging service 1 that is suitable for sending multicast data to the terminal T1. In this arrangement, the subscriber registers with the service as described above, but the service is linked to a router in the network that is responsible for the distribution of multicast data to IP-enabled receivers. In the case where the multicast content provider is distributing its multicast content in accordance with PIM-Sparse mode protocol, there is a rendez-point router (shown as RP router 1401 in FIG. 14), which receives "Join" requests from receivers, and joins them to the distribution of multicast data emanating from the source (shown as source router 1403). In this arrangement a conventional RP router 1401 is modified so as to include the selecting software 401 and message modification software 403 as described for the other embodiments, which collectively add content data (steps 205, 206) to the multicast content. In this example the subscriber associated with terminal T1 is the recipient of the data and the source 1401 is the sender. For more information regarding the PIM Sparse Mode protocol, the reader is referred to "Multicast networking and applications", by C. Kenneth Miller, Published by Addison-Wesley, ISBN 0-201-30979-3.

Figure 15:
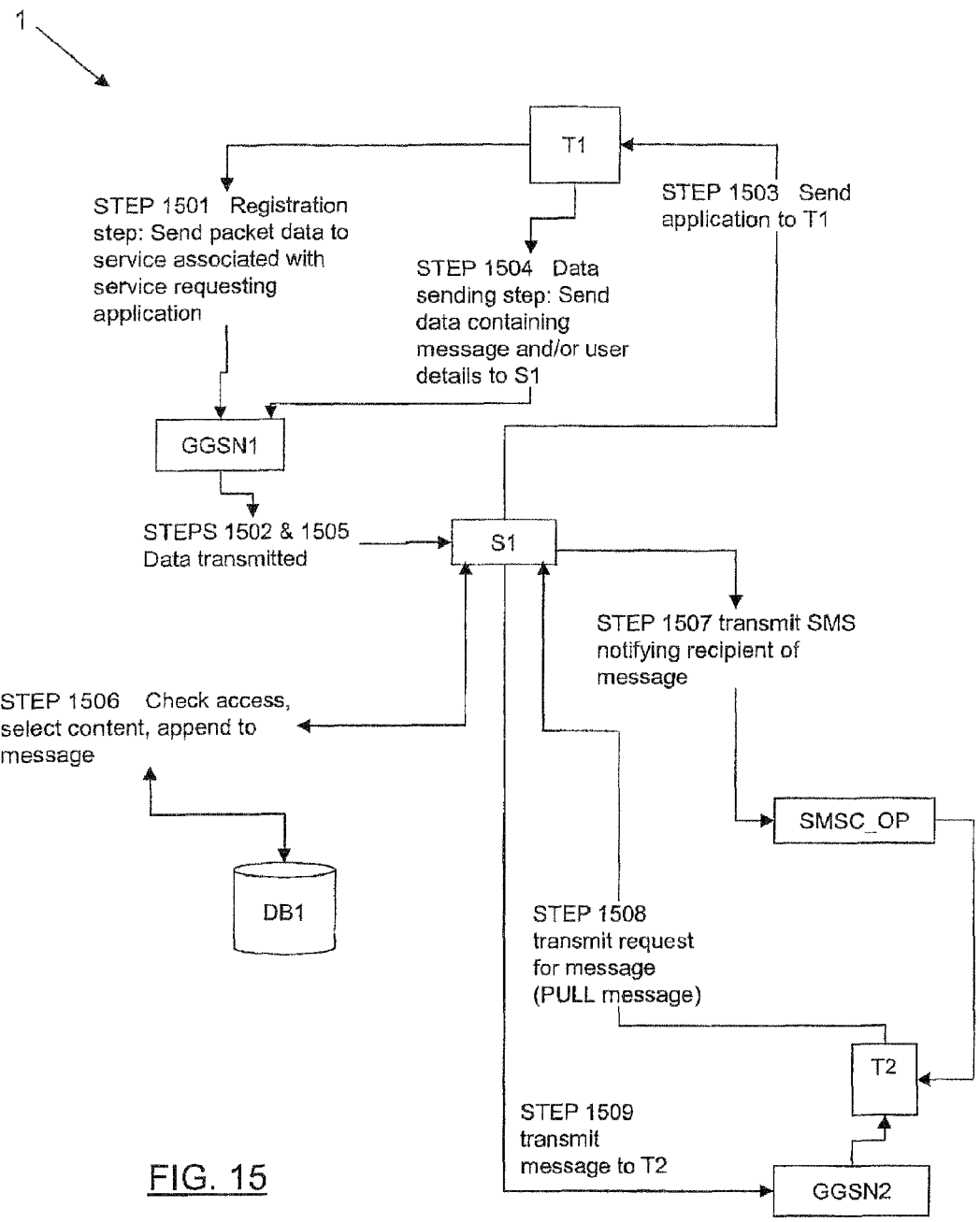
FIG. 15 is a schematic illustration of an alternative configuration of components of a mobile network according to a sixth embodiment of the present invention.

FIG. 15 shows another arrangement of the data messaging service 1 in which messages are sent to the server S1 via gateway GPRS support node GGSN 1 as data packets (steps 1504, 1505), and the server S1 modifies the message (step 1506). Having modified the message, the server S1 stores the same and sends a notifying SMS message (step 1507) to the recipient; in response to receipt of the notification message the terminal T2 has the opportunity to retrieve the stored message from the server S1 (steps 1508, 1509). In the arrangement shown in FIG. 15, an application is sent to the terminal T1 from the server S1 in response to receipt of a registration message (steps 1501, 1503) and both the user's demographic information and any subsequently composed messages are captured by the application and then sent onto the server S1 via GGSN1. It will be appreciated that the demographic data could instead by entered via a WAP page that is sent to the terminal T1 as described above in the context of the foregoing embodiments.

Figure 16:
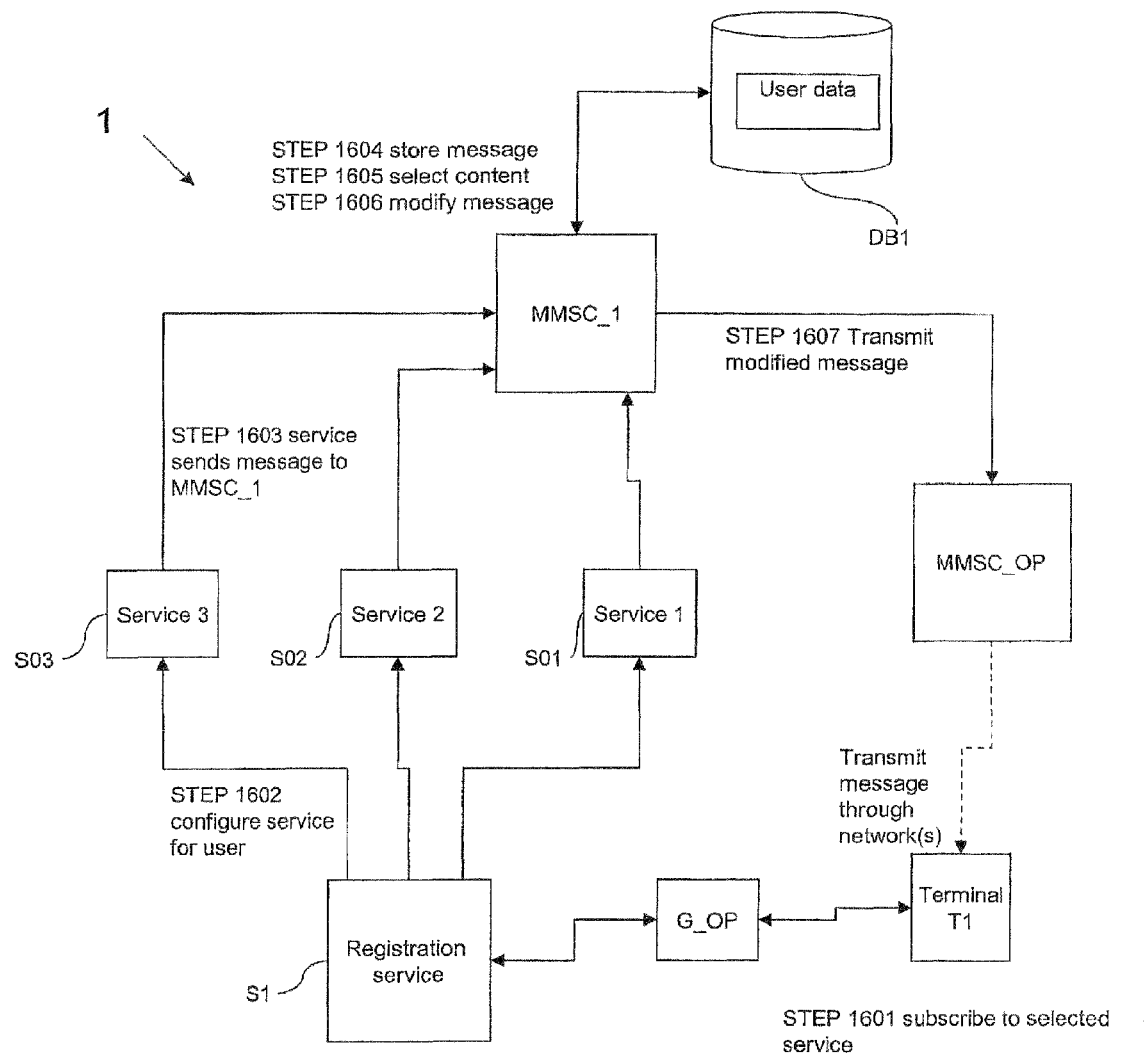
FIG. 16 is a schematic illustration of a first embodiment of components of a mobile network according to a second aspect of the present invention.

The foregoing embodiments describe arrangements for modifying messages emanating from individual subscribers. However, the invention can also be applied to modify data messages emanating from an information source, and a suitable arrangement for performing such a modification is shown in FIG. 16. Parts shown in FIG. 16 that are identical to those shown in FIGS. 1-15 are allocated identical reference numbers and identifiers and will not be described in any further detail; as for the figures relating to modification of personal messages, the arrows indicate data flows within the data messaging system 1 and the blocks indicate components thereof.

In this aspect of the invention messages typically originate from an information service provided by an automated software application running on a server connected to the network, which is generally referred to herein as a content provider. In the arrangement shown in FIG. 16, the data messaging system 1 comprises WAP gateway G_OP; a plurality of content servers S01, S02, S03 configured to generate and transmit messages to a terminal T1 in accordance with specified conditions; a services server S1 arranged to receive requests from the terminal T1 for content from one or more of the content servers S01, S02, S03; first and second store-and-forward message servers MMSC_1, MMSC_OP; and a database DB1, arranged to store data in respect of subscribers, terminal T1 and content data. Each of the content servers S01, S02, S03 is associated with a particular content provider.

In one arrangement the first message server MMSC_1, together with the services server S1, are arranged to operate inside an operator's network. The services server S1 handles requests for content data from the terminal T1 either on a per-request basis or on an on-going basis as specified by a user of the terminal T1 when subscribing to the content service, sending requests onto an appropriate one of the content servers S01, S02, S03 accordingly. The server S1 is also arranged to receive details of those users who have additionally subscribed to a message modification service according to an embodiment of the invention, and to this end is configured as, and operates in accordance with, the arrangement shown in FIG. 3.

Each content server S01, S02, S03 is configured in such a way that MMS messages destined for a subscriber to the message modification service are sent to the first message server MMSC_1 rather than to the second (network operator's main) message server MMSC_OP. Accordingly data identifying the address of the first message server MMSC_1 are configured in each of the content servers S01, S02, S03 so that MMS messages emanating therefrom are sent to the first message server MMSC_1 in the first instance. The steps involved in modifying a message by the data messaging system 1 will now be described, assuming that the user of Terminal T1 has placed a request with server S1 for data relating to estimated departure times of trains departing from London Victoria destined for Lyme Regis at 17:30. Assuming a request for this information to have been received by content server S01, a MMS message comprising this information is sent by the content server S01 at 17:30 (step 1603). At step 1604, the MMS message is received and stored by the proxy message server MMSC_1, in accordance with conventional techniques and at step 1605 the selecting software 401 selects content data from the database DB1 as described above with reference to FIG. 8. Once the content data have been selected, the message modification software 403 modifies, at step 1606, the MMS that was stored at step 1604 so as to include at least part of the selected content data and the modified MMS is transmitted to the network operator's message server MMSC_OP at step 1607, the message being subsequently delivered to the recipient (T1) in accordance with conventional methods.

Figure 17:
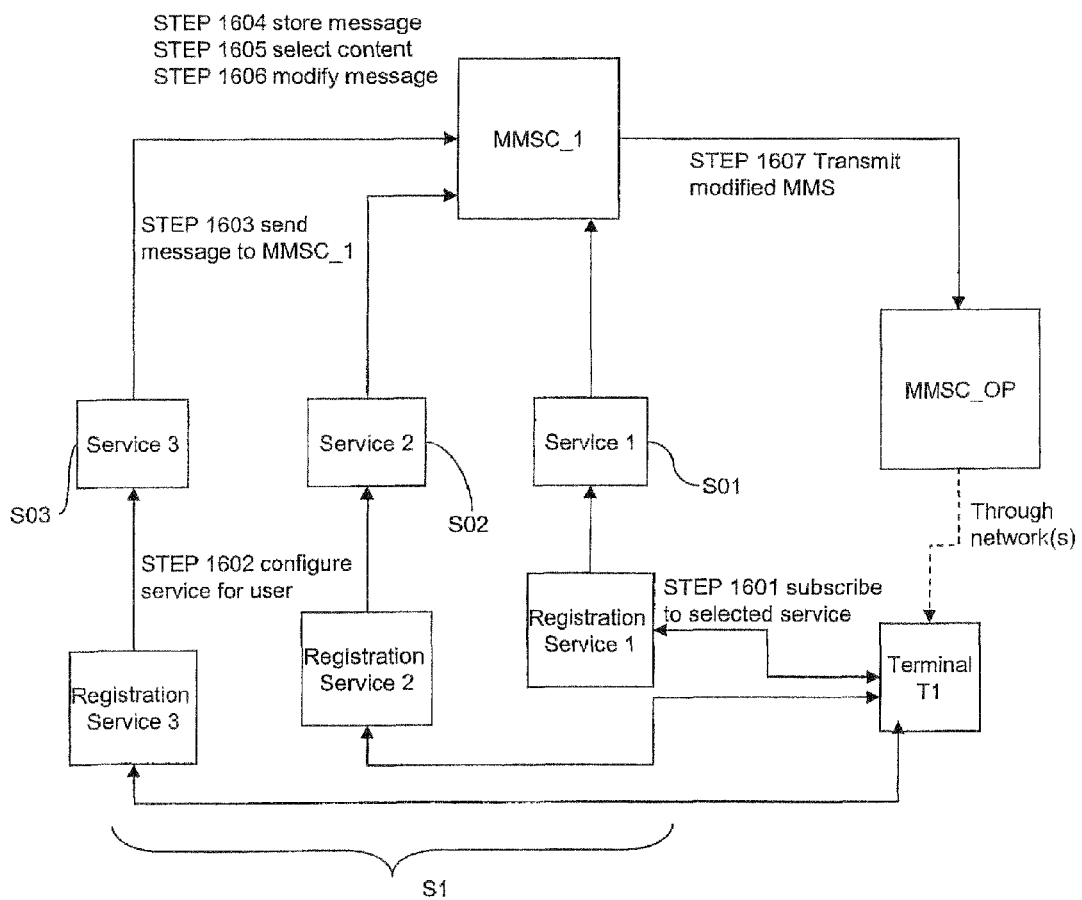
FIG. 17 is a schematic illustration of a second embodiment of components of a mobile network according to a second aspect of the present invention.

As shown in FIG. 16, the services server S1 is typically managed by the network operator, whilst the content servers S01, S02, S03 are managed by third parties. However, each content server S01, S02, S03 can have a services server associated therewith, in which case both the service server S1 and the content server will be managed by third parties; such an arrangement is shown in FIG. 17. Whilst in the first aspect of the invention settings corresponding to the proxy message server MMSC_1 are sent via an OTA message to user terminals (since this is where the messages originate), in embodiments according to this second aspect of the invention (where messages originate from content servers S01, S02, S03) the content servers could be notified of the settings, e.g. via an email or SMS message and automatically change their proxy server settings in response to receipt thereof.

It is to be noted that, whilst in the embodiments above the content data are branded media content, the invention could be applied to many other types of content data. For example, a service according to the invention may be used in tracking the eventual super-distribution of multimedia content across different operators, in which case special tags (e.g. in SWIL files and watermarks in multimedia files), each being associated with an operator, could be used.

The invention claimed is:

1. A method comprising:
receiving, by a processor, a message sent through a data communications network, the message including transmission data identifying a destination of the message and a message body identifying content thereof;
reviewing, by the processor, a schedule identifying entertainment activities, wherein the schedule is accessed from an electronically available entertainment listing;
selecting, by the processor, in response to receiving the message, data in accordance with an entertainment activity that overlaps, at least in part, with a time of transmission or reception of the message, wherein the data is selected from one of a plurality of stores of selectable data, each store being associated with a different subject and each having selectable data therein, and wherein an identifier identifying one of the subjects has been received prior to receipt of the message, the identifier thereby identifying a store from which data are to be selected;

creating, by the processor, a modified message including the data selected in accordance with an entertainment activity that overlaps, at least in part, with a time of transmission or reception of the message; and transmitting, by the processor, the modified message to the destination.

2. The method of claim 1, wherein the selectable data are specified in advance of receipt of the message.

3. The method of claim 1, wherein the data are selected in accordance with data associated with the message.

4. The method of claim 1, wherein the data is selected from advertising data.

5. The method of claim 1, wherein the selection of data is performed on the basis of a parameter that is not directly related to the location of the sending party.

6. The method of claim 1, wherein the data is selected on the basis of characteristics of the identified recipient, and wherein the characteristics include any of location, context, weather, age, and preference information associated with the recipient.

7. The method of claim 1, wherein, in response to identifying from the transmission data that there is a plurality of recipients of the message, identifying characteristics common to at least two of the recipients, and selecting data on the basis of the common characteristics.

8. The method of claim 1, further comprising:
comparing the selected data with data identifying subject matter that the recipient is not interested in, and, in the event that the selected data matches data corresponding to the identified subject matter, the message is not modified prior to transmission to the recipient.

9. The method of claim 1, further comprising:
recording the data that have been included in the transmitted messages;
comparing the recorded data with the data selected for inclusion in the message; and
repeating, in the event that the recorded data match the selected data, the element of selecting.

10. The method of claim 1, wherein the data is selected based on location data.

11. A system comprising:
a processor; and
a memory containing instruction that, when executed, cause the processor to:
receive a message sent through a data communications network, the message including transmission data identifying a destination of the message and a message body identifying content thereof;
review a schedule identifying entertainment activities, wherein the schedule is accessed from an electronically available entertainment listing;
select, in response to receiving the message, data in accordance with an entertainment activity that overlaps, at least in part, with a time of transmission or reception of the message, wherein the data is selected from one of a plurality of stores of selectable data, each store being associated with a different subject and each having selectable data therein, and wherein an identifier identifying one of the subjects has been received prior to receipt of the message, the identifier thereby identifying a store from which data are to be selected;
create a modified message including the data selected in accordance with an entertainment activity that overlaps, at least in part, with a time of transmission or reception of the message; and
transmit the modified message to the destination.

12. The system of claim 11, wherein the selectable data are specified in advance of receipt of the message.

13. The system of claim 11, wherein the data are selected in accordance with data associated with the message.

14. The system of claim 11, wherein the data is selected from advertising data.

15. The system of claim 11, wherein the selection of data is performed on the basis of a parameter that is not directly related to the location of the sending party.

16. The system of claim 11, wherein the data is selected on the basis of characteristics of the identified recipient, and wherein the characteristics include any of location, context, weather, age, and preference information associated with the recipient.

17. The system of claim 11, wherein, in response to identifying from the transmission data that there is a plurality of recipients of the message, identifying characteristics common to at least two of the recipients, and selecting data on the basis of the common characteristics.

18. The system of claim 11, wherein the instructions further cause the processor to:
compare the selected data with data identifying subject matter that the recipient is not interested in, and, in the event that the selected data matches data corresponding to the identified subject matter, the message is not modified prior to transmission to the recipient.

19. The method of claim 11, wherein the instructions further cause the processor to:
record the data that have been included in the transmitted messages;
compare the recorded data with the data selected for inclusion in the message; and
repeating, in the event that the recorded data match the selected data, the element of selecting.

20. The system of claim 11, wherein the data is selected based on location data.

21. A non-transitory computer-readable medium containing instruction that, when executed by a computing device, cause the computing device to:
receive a message sent through a data communications network, the message including transmission data identifying a destination of the message and a message body identifying content thereof;
review a schedule identifying entertainment activities, wherein the schedule is accessed from an electronically available entertainment listing;
select, in response to receiving the message, data in accordance with an entertainment activity that overlaps, at least in part, with a time of transmission or reception of the message, wherein the data is selected from one of a plurality of stores of selectable data, each store being associated with a different subject and each having selectable data therein, and wherein an identifier identifying one of the subjects has been received prior to receipt of the message, the identifier thereby identifying a store from which data are to be selected;
create a modified message including the data selected in accordance with an entertainment activity that overlaps, at least in part, with a time of transmission or reception of the message; and
transmit the modified message to the destination.

22. The non-transitory computer-readable medium of claim 21, wherein the selectable data are specified in advance of receipt of the message.

23. The non-transitory computer-readable medium of claim 21, wherein the data are selected in accordance with data associated with the message.

24. The non-transitory computer-readable medium of claim 21, wherein the data is selected from advertising data.

25. The non-transitory computer-readable medium of claim 21, wherein the selection of data is performed on the basis of a parameter that is not directly related to the location of the sending party.

26. The non-transitory computer-readable medium of claim 21, wherein the data is selected on the basis of characteristics of the identified recipient, and wherein the characteristics include any of location, context, weather, age, and preference information associated with the recipient.

27. The non-transitory computer-readable medium of claim 21, wherein, in response to identifying from the transmission data that there is a plurality of recipients of the message, identifying characteristics common to at least two of the recipients, and selecting data on the basis of the common characteristics.

28. The non-transitory computer-readable medium of claim 21, wherein the instructions further cause the computing device to:

compare the selected data with data identifying subject matter that the recipient is not interested in, and, in the event that the selected data matches data corresponding to the identified subject matter, the message is not modified prior to transmission to the recipient.

29. The non-transitory computer-readable medium of claim 21, wherein the instructions further cause the computing device to:

record the data that have been included in the transmitted messages;

compare the recorded data with the data selected for inclusion in the message; and repeat, in the event that the recorded data match the selected data, the element of selecting.

30. The non-transitory computer-readable medium of claim 21, wherein the data is selected based on location data.

* * * * *